US008732751B2

(12) United States Patent
Yamada et al.

(10) Patent No.: US 8,732,751 B2
(45) Date of Patent: *May 20, 2014

(54) AUDIO VIDEO SYSTEM, CONTROL APPARATUS, OUTPUT APPARATUS, AND PROGRAM

(71) Applicant: Panasonic Corporation, Osaka (JP)

(72) Inventors: Masazumi Yamada, Osaka (JP); Junji Yoshida, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/685,933

(22) Filed: Nov. 27, 2012

(65) Prior Publication Data

US 2013/0100353 A1    Apr. 25, 2013

Related U.S. Application Data

(62) Division of application No. 12/159,372, filed as application No. PCT/JP2006/325723 on Dec. 25, 2006, now Pat. No. 8,345,165.

(30) Foreign Application Priority Data

Dec. 27, 2005    (JP) .................................. 2005-374466

(51) Int. Cl.
*H04N 5/445*    (2011.01)

(52) U.S. Cl.
USPC .......................................................... 725/38

(58) Field of Classification Search
USPC ............................................. 725/38, 39, 120
See application file for complete search history.

(56) References Cited

U.S. PATENT DOCUMENTS

| 2002/0047944 | A1 | 4/2002 | Sato |
| 2004/0143847 | A1 | 7/2004 | Suzuki |
| 2005/0183115 | A1* | 8/2005 | Maruyama et al. ............. 725/38 |

FOREIGN PATENT DOCUMENTS

| CN | 1692628 | 11/2005 |
| JP | 62-040844 | 2/1987 |
| JP | 2000-350201 | 12/2000 |
| JP | 2001-309459 | 11/2001 |
| JP | 2002-354351 | 12/2002 |

OTHER PUBLICATIONS

International Search Report issued in International (PCT) Application of which the parent application is the U.S. National Stage.
"High-Definition Multimedia Interface", Specification Version 1.1, HDMI Licensing, May 20, 2004, pp. ii-82.
IEEE 1394 Trade Association, "TA Document 2001001 AV/C Panel Subunit Specification 1.1", May 8, 2001.

* cited by examiner

*Primary Examiner* — Jivka Rabovianski
(74) *Attorney, Agent, or Firm* — Wenderoth, Lind & Ponack, L.L.P.

(57) ABSTRACT

When a conventional audio video system is used, it is necessary to identify an input source of audio video information. For this reason, complicated operations and slow operation times have been a problem. A control apparatus includes: an instruction receiving unit for receiving an instruction to be provided to an audio video supplying apparatus which is an input source of audio video information currently outputted from an output apparatus that outputs the audio video information; a determination unit for determining one of the audio video supplying apparatuses to be the input source of the audio video information currently being outputted from the output apparatus; and a control information sending unit for outputting control information to the audio video supplying apparatus determined by the determination unit, the control information corresponding to the instruction received by the instruction receiving unit and being used for controlling the audio video supplying apparatus.

3 Claims, 13 Drawing Sheets

FIG. 6
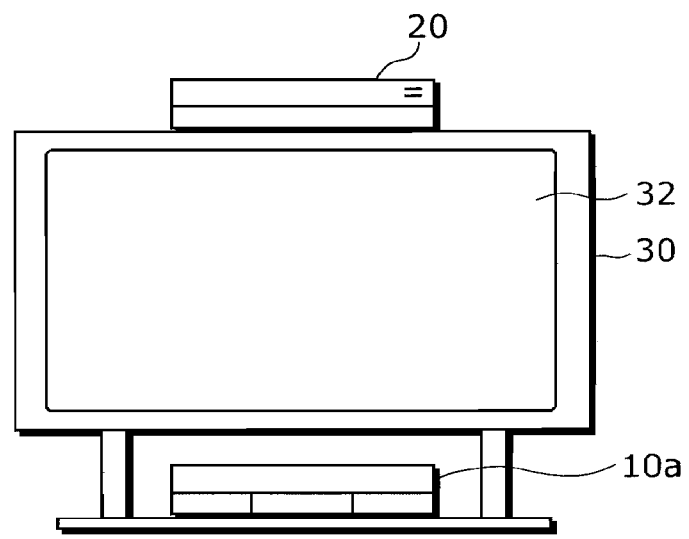
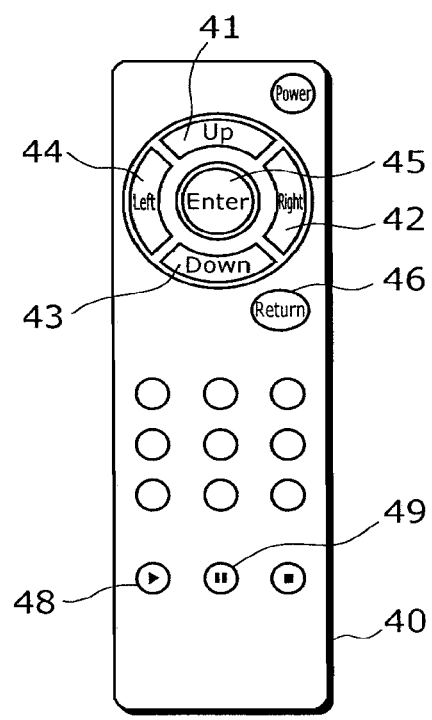

FIG. 8

| Instruction | Control information |
|---|---|
| UP | up |
| RIGHT | right |
| DOWN | down |
| LEFT | left |
| ENTER | enter |
| RETURN | retern |
| PLAY | play |
| PAUSE | pause |
| ⋮ | ⋮ |

FIG. 9

| Control information | State | Control |
|---|---|---|
| up | Currently outputting broadcast | channel_up |
| up | Currently outputting menu | move_up |
| up | Currently outputting EPG | move_up |
| right | Currently outputting broadcast | change_language |
| right | Currently outputting menu | move_right |
| ⋮ | ⋮ | ⋮ |
| down | Currently outputting broadcast | channel_up |
| down | Currently outputting menu | move_up |
| ⋮ | ⋮ | ⋮ |

FIG. 11

| Control information | State | Control |
|---|---|---|
| up | Currently outputting menu | move_up |
| up | Currently playing back content | pause |
| ⋮ | ⋮ | ⋮ |
| right | Currently outputting menu | move_right |
| right | Currently playing back content | forward |
| ⋮ | ⋮ | ⋮ |
| enter | Currently outputting menu | play |
| enter | Currently displaying reservation | execute |
| ⋮ | ⋮ | ⋮ |
| pause | Currently playing back content | pause |
| ⋮ | ⋮ | ⋮ |

AUDIO VIDEO SYSTEM, CONTROL APPARATUS, OUTPUT APPARATUS, AND PROGRAM

This application is a Divisional Application of Ser. No. 12/159,372, filed Jun. 26, 2008, which is the National Stage of International Application No. PCT/JP2006/325723, filed Dec. 25, 2006.

TECHNICAL FIELD

The present invention relates to an audio video system which includes an output apparatus, such as a television (referred to as a "TV" hereafter), and particularly relates to an audio video system which enables an output apparatus to output audio information and video information outputted from another apparatus.

BACKGROUND ART

An output apparatus, such as a TV, has various uses besides receiving TV broadcasts for TV watching. For example, when connected to DVRs (Digital Video Recorders) such as a VTR (Video Tape Recorder) and a DVD recorder, the output apparatus enables content played back by these external apparatuses to be watched. This is why a TV often includes one or more external input terminals or the like in addition to an antenna terminal for receiving the TV broadcasts. A user can switch among these inputs by operating a remote control (referred to as the "remote" hereafter) or buttons on the main unit.

Thus, a TV which includes many external input terminals (particularly common in high-end models) has an advantage of simultaneously connecting to many external apparatuses including a DVR and a home-use game machine. Conversely, there is a disadvantage that the operation becomes burdensome since the input switching needs to be performed manually. Moreover, after the input switching is carried out, it is also burdensome to change to another remote of the corresponding external apparatus and perform the operation.

With this being the situation, a technology for switching inputs of a TV using command transmission between the TV and an external apparatus such as a VTR, and a technology for transferring descriptions of remote keys using such command transmission have been suggested or standardized.

For example, a playback apparatus disclosed in Patent Reference 1 sends a TV a signal such as an infrared signal, when starting playback, to instruct that input should be switched to an input terminal of the TV to which its own output terminal is connected. Also, when the power is turned off, this playback apparatus sends the TV a signal to instruct that the input of the TV should be switched to an antenna or a tuner. With this, an instruction given to the playback apparatus to display a menu screen can be sent from a remote of the playback apparatus and, at the same time, a remote key code can be sent from the remote of the playback apparatus directly to the TV using an infrared signal. As a result, the input of the TV can be switched to the input terminal to which the playback apparatus is connected and the menu screen of the playback apparatus can be displayed on a screen of the TV.

Also, Patent Reference 2 discloses that an apparatus and a controller are connected by a bus line capable of two-way communication and that the apparatus can be intensively controlled by the controller via this bus line.

Moreover, AV. link standard (Non-patent Reference 1) defines commands for interfacing between a TV and a VTR or the like. According to this standard, the VTR issues a predetermined command to the TV when the VTR starts playback or when the VTR displays a menu screen. With this, an instruction to display the menu screen can be sent from a remote of the playback apparatus to the playback apparatus and, at the same time, a predetermined screen switching request command can be sent from the playback apparatus to the TV via an AV. Link line. As a result, the input of the TV can be switched to a signal received from the input terminal to which the playback apparatus is connected, and the menu screen of the playback apparatus can be displayed on a TV screen.

After the menu screen is displayed, the playback apparatus can be operated by means of a remote key code sent from the remote of the playback apparatus to the playback apparatus using an infrared signal, as in a usual manner of use. Accordingly, this can reduce time and effort in shifting to a remote of the TV to perform an operation for switching the TV input and then shifting to the remote of the playback apparatus to operate the playback apparatus. Moreover, when a TV input switching key is provided on the remote of the playback apparatus, it is not necessary to shift to the remote of the TV. In this case also, by pushing the TV input switching key a plurality of times, time and effort can be reduced in switching the TV input to the signal received from the input terminal to which the playback apparatus is connected. A CEC line of an HDMI interface disclosed in Non-patent Reference 2 can also realize the same function.

Furthermore, Non-patent Reference 3 defines commands for transferring remote key codes between apparatuses connected by IEEE1394. According to this definition, by transferring a key code, such as "up", "down", "left", "right", or "enter", on a remote of a TV to an apparatus connected to the TV, using a predetermined command, for example, the apparatus can be operated using the remote of the TV.

Patent Reference 1: Japanese Unexamined Patent Application Publication No. 2000-350201
Patent Reference 2: Japanese Unexamined Patent Application Publication No. 62-40844
Non-patent Reference 1: CENELEC AV. Link (EN50157-1, EN50157-2-1, EN50157-2-2, and EN50157-2-3)
Non-patent Reference 2: HDMI Specification 1.1 (CEC Supplement unit)
Non-patent Reference 3: IEEE1394 Trade Association TA Document 2001001 AV/C Panel Subunit Specification 1.1

DISCLOSURE OF INVENTION

Problems that Invention is to Solve

In the case of the conventional technology, however, for operating an apparatus which is an input source of audio information and video information which are currently being outputted by an output apparatus, such as a TV, it is necessary for the user first to judge which apparatus is the input source of the audio information and the video information currently being outputted by the output apparatus and then to identify the apparatus for the operation. On account of this, the user always has to be aware of which apparatus is to be operated and this causes a problem that the operation becomes extremely complicated.

Especially when a number of apparatuses are connected to an output apparatus, such as a TV, it is difficult and troublesome to identify an input source of video information or the like which is currently being outputted. This thus causes a problem that the operation cannot be performed intuitively.

Means to Solve the Problems

The audio video system of the present invention includes: an output apparatus which outputs audio video information including at least one of audio data or video data; an audio video supplying apparatus which outputs the audio video information to the output apparatus; and a control apparatus which controls the audio video supplying apparatus, wherein the output apparatus includes: an audio video information input unit which receives the audio video information outputted from the audio video supplying apparatus; and an audio video output unit which outputs the audio video information, the audio video supplying apparatus includes: an audio video information processing unit which processes the audio video information; an audio video information output unit which outputs the audio video information; a control information receiving unit which receives control information from the control apparatus, the control information being used for controlling at least one of the audio video information processing unit or the audio video information output unit; and a control unit which controls at least one of the audio video information processing unit or the audio video information output unit, according to the control information, and the control apparatus includes: an instruction receiving unit which receives an instruction to be provided to the audio video supplying apparatus which is an input source of the audio video information currently being outputted from the output apparatus; a determination unit which determines the audio video supplying apparatus to be the input source of the audio video information currently being outputted from the output apparatus; and a control information sending unit which sends the control information corresponding to the instruction received by the instruction receiving unit to the audio video supplying apparatus determined by the determination unit.

With this configuration, by operating the control apparatus, the audio video supplying apparatus which is the input source of audio video information currently being outputted by the output apparatus can be unconsciously controlled.

Also, according to the audio video system of the present invention, the output apparatus further includes: an input selecting unit which selects one input source from among plural input sources including the audio video supplying apparatus; and a selection information sending unit which sends, to the control apparatus, selection information indicating the audio video supplying apparatus selected by the input selecting unit; the audio video information input unit receives the audio video information outputted from the audio video supplying apparatus selected by the input selecting unit; the control apparatus further includes: a selection information receiving unit which receives the selection information; and the determination unit determines, on the basis of the selection information, the audio video supplying apparatus to be the input source of the audio video information currently being outputted from the output apparatus.

With this configuration, by operating the control apparatus, the audio video supplying apparatus which is the input source of audio video information currently being outputted by the output apparatus can be unconsciously controlled.

Moreover, according to the audio video system of the present invention, the control apparatus further includes: a request information sending which sends request information for requesting the selection information, to the output apparatus; the output apparatus further includes: a request information receiving unit which receives the request information; and the selection information sending unit sends the selection information in response to the reception of the request information.

With this configuration, by operating the control apparatus, the audio video supplying apparatus which is the input source of audio video information currently being outputted by the output apparatus can be unconsciously controlled.

Furthermore, according to the audio video system of the present invention, the request information sending unit sends the request information when the instruction receiving unit receives the instruction.

With this configuration, when receiving an instruction to perform control, the control apparatus can obtain the latest information regarding the apparatus which is the input source of the output apparatus and can reliably control the apparatus which is the input source of the audio video information that the output apparatus is currently outputting. For example, suppose a case where the information regarding the audio video supplying apparatus which is the input source is sent from the output apparatus to the control apparatus on a regular basis. In this case, when the output source is changed before the next information is sent, the operation ends up being performed on the pre-change audio video supplying apparatus through an operation performed via the control apparatus. On the other hand, with the stated configuration, it becomes possible for the control apparatus to obtain the information, immediately before performing the operation, regarding the audio video supplying apparatus which is the input source and to perform the operation always on the audio video supplying apparatus which is currently performing output.

Also, according to the audio video system of the present invention, the audio video supplying apparatus further includes: an input setting request information sending unit which sends input setting request information to the control apparatus for requesting that the audio video supplying apparatus be set as the input source: the control apparatus further includes an input setting request information receiving unit which receives the input setting request information: and the determination unit determines, on the basis of the output start information, the audio video supplying apparatus to be the input source of the audio video information currently being outputted from the output apparatus.

With this configuration, the control apparatus does not need to inquire of the output apparatus about the apparatus which is the input source of the audio video information that the output apparatus is currently outputting, thereby enhancing the speed of processing performed to control the apparatus which is the input source.

Moreover, according to the present invention, the audio video system includes two or more of the audio video supplying apparatus, wherein the output apparatus internally includes at least one of the two or more audio video supplying apparatuses.

With this configuration, the output apparatus can also select its internal audio video supplying apparatus as the input source of the audio video information.

Furthermore, according to the audio video system of the present invention, the control unit controls the audio video supplying apparatus of the output apparatus, on the basis of the control information.

With this configuration, when the internal audio video supplying apparatus of the output apparatus is the input source of the audio video information, the control apparatus can control this audio video supplying apparatus as well.

Also, according to the present invention, the audio video system includes two or more of the audio video supplying apparatus, wherein the control apparatus internally includes at least one of the two or more audio video supplying apparatuses.

With this configuration, the output apparatus can also select the internal audio video supplying apparatus of the control apparatus as the input source of audio video information.

Moreover, according to the audio video system of the present invention, the output apparatus includes the control apparatus.

With this configuration, the output apparatus can control the apparatus which is the input source of the audio video information that the present output apparatus is currently outputting.

Effects of the Invention

Using the audio video system and so forth according to the present invention, the audio video supplying apparatus which is the input source of the audio video information that the output apparatus is currently outputting can be controlled instantaneously and intuitively through operating the control apparatus.

BRIEF DESCRIPTION OF DRAWINGS

FIG. 6 is a conceptual diagram according to the first embodiment.

FIG. 8 shows a control information management table according to the first embodiment.

FIG. 9 shows a control management table according to the first embodiment.

FIG. 11 shows a control management table according to the first embodiment.

Figure 1:
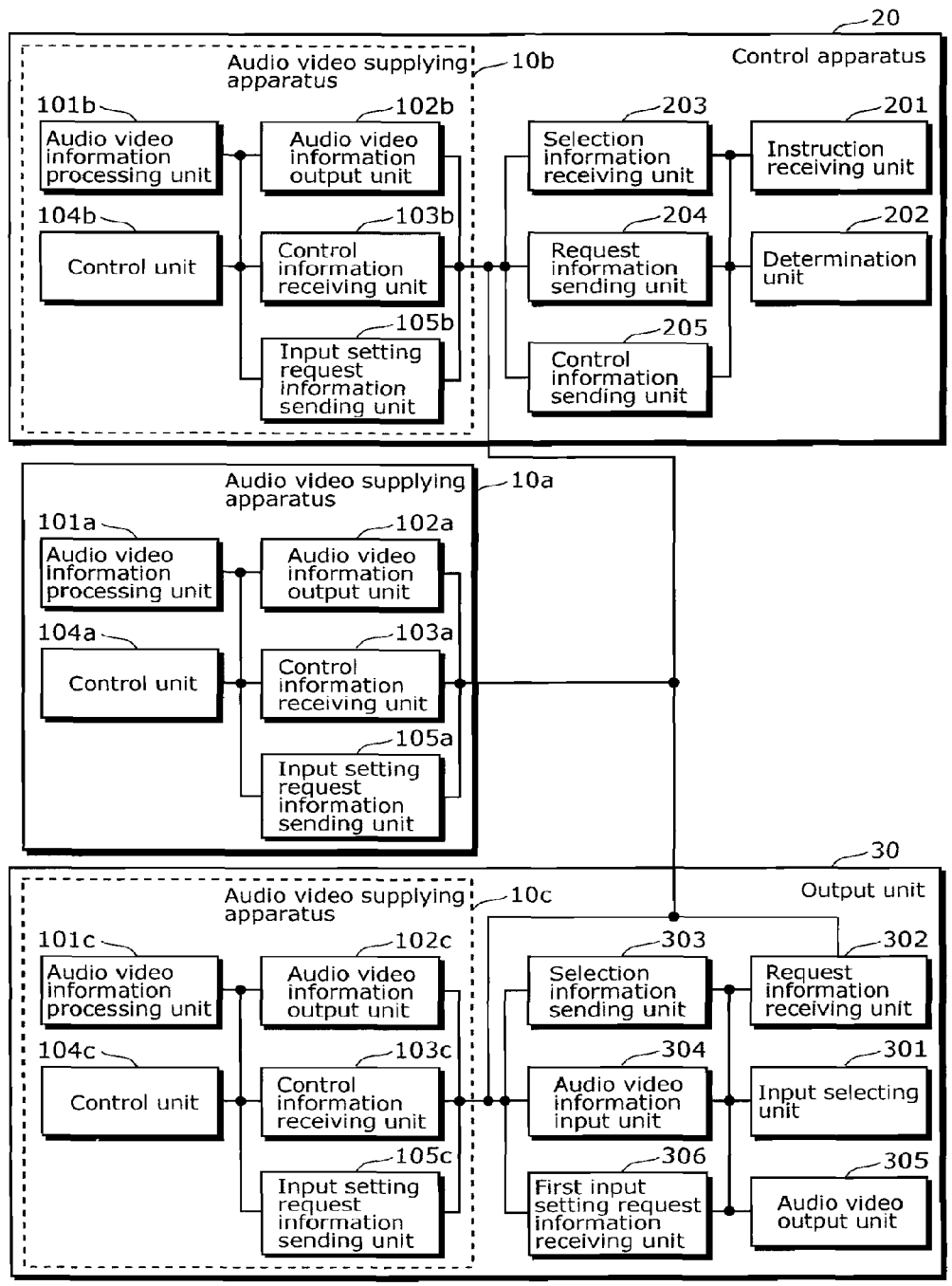
FIG. 1 is a block diagram of an audio video system according to a first embodiment.

NUMERICAL REFERENCES 10a to 10c audio video supplying apparatuses
20, 21 control apparatuses
30, 31 output apparatuses
40 remote
41 display
70 control correspondence image
101a to 101c audio video information processing units
102a to 102c audio video information output units
103a to 103c control information receiving units
104a to 104c control units
105a to 105c input setting request information sending units
201 instruction receiving unit
202, 212 determination units
203 selection information receiving unit
204 request information sending unit
205 control information sending unit
206 second input setting request information receiving unit
301 input selecting unit
302 request information receiving unit
303 selection information sending unit
304 audio video information input unit
305 audio video output unit
306 first input setting request information receiving unit

BEST MODE FOR CARRYING OUT THE INVENTION

The following is a description of embodiments of an audio video system and so forth, with reference to the drawings. It should be noted that components designated by the same reference characters perform the same operations in the embodiments, and thus re-explanation may be omitted.

First Embodiment

FIG. 1 is a block diagram of an audio video system according to the present embodiment.

The audio video system includes audio video supplying apparatuses 10a to 10c, a control apparatus 20, and an output apparatus 30. Here, the audio video supplying apparatus 10b is set inside the control apparatus 20, and the audio video supplying apparatus 10c is set inside the output apparatus 30. Each of the apparatuses can receive and send information. The apparatuses may be connected by a network, such as the Internet or a wireless or wired LAN, or may be connected by short-distance wireless communications, such as Bluetooth (registered trademark). Alternatively, the apparatuses may be connected by a bus, such as a USB or an IEEE1394. However, it does not matter what method is used for connecting the apparatuses. Additionally, a means of receiving and sending information may be a communication means, a broadcast means, or the like. It should be noted that although an explanation is given here about a case where the audio video supplying apparatus 10a is the only audio video supplying apparatus provided outside the control apparatus 20 and the output apparatus 30, the number of audio video supplying apparatuses provided outside the control apparatus 20 and the output apparatus 30 may be arbitrary as long as the number is one or more. Moreover, although the explanation is given about the case where the control apparatus 20 and the output apparatus 30 respectively include the audio video supplying apparatuses 10b and 10c, these may be omitted as necessary.

The audio video supplying apparatus 10a includes an audio video information processing unit 101a, an audio video information output unit 102a, a control information receiving unit 103a, a control unit 104a, and an input setting request information sending unit 105a.

The audio video supplying apparatus 10a may be any kind of apparatus, such as a DVD recorder, a DVD player, a VTR, a hard disk recorder, an external television tuner, or a CD player, as long as it can output audio video information regarding at least one of audio and video to the output apparatus 30 or the like. The audio video information refers to video information, audio information, and audio video information. Here, it does not matter whether the audio video information is compressed or uncompressed. To be more specific, the audio video information is used for showing audio and video and, for example, the information is used for playing back audio and video. The video referred to here may be a moving image or a still image. Here, a resolution does not matter. Moreover, the audio video information may be digital information or analogue information. Furthermore, a data format of the audio video information does not matter, and the audio video information may be compressed according to MPEG, JPEG, or the like, or may be uncompressed. Additionally, content of audio and video of the audio video information does not matter. For example, the audio video information may be content of a movie, a program, or the like, or may be a menu or the like.

The audio video information processing unit 101a processes the audio video information. The processing performed on the audio video information by the audio video information processing unit 101a is, for example, processing of obtaining audio video information to be outputted. To be more specific, when the audio video supplying apparatus 10a is a DVD recorder, for example, the processing includes processing of reading and decoding a video signal and an audio signal from a DVD disk and processing of generating video information for displaying a menu screen and the like of the DVD recorder. Moreover, when the audio video supplying apparatus 10a is a television tuner or the like, the processing includes processing of receiving a radio wave via an antenna, which is not illustrated, to obtain video information and audio information. Note that the processing performed by the audio video information processing unit 101a may include various processing except for output processing. For example, the processing performed by the audio video information processing unit 101a may include processing, other than processing of obtaining the audio video information. For instance, the processing may be: processing of storing the audio video information into a hard disk or the like; processing of adjusting the volume and the like; or processing for programmed recording. The audio video information processing unit 101a can usually be realized by an MPU, a memory, or the like. The operating procedure of the audio video information processing unit can usually be realized by software, and this software is recorded on a recording medium, such as a ROM. However, the procedure may be realized by hardware (a dedicated circuit).

The audio video information output unit 102a outputs the audio video information, and more specifically, outputs the audio video information obtained by the audio video information processing unit 101a. The audio video information output unit 102a outputs the audio video information to the output apparatus 30, to be more precise. Moreover, when outputting the audio video information, the audio video information output unit 102a may include or add identification information to distinguish the audio video supplying apparatus 10a from the other apparatuses. The identification information may be any kind of information as long as the information distinguishes the apparatus from the other apparatuses. Also, the identification information does not need to uniquely identify the audio video supplying apparatus 10a. For example, the identification information may be a string of characters or numbers specific to the apparatus, or may be a serial number of the apparatus. Or, the identification information may be an address of the audio video supplying apparatus on the network, such as an IP address, or may be a physical address like a MAC address. Alternatively, the identification information may be a product name of the apparatus, or a classification or a model number of the apparatus. Output referred to here is a concept that includes sending to an external apparatus or the like. The audio video information output unit 102a may or may not include: a sending device for sending on the network or the like; an interface for communications; and an interface for signal output. The audio video information output unit 102a may be realized by hardware, or may be realized by software, such as a driver for driving the sending device and the like. The audio video information output unit 102a can be realized by a wired or wireless communication means, a broadcast means, or the like.

The control information receiving unit 103a receives control information for controlling at least one of the audio video information processing unit 101a and the audio video information output unit 102a, from the control apparatus 20. When the control is needed for only one of the audio video information processing unit 101a and the audio video information output unit 102a, the control information received by the control information receiving unit 103a may be the control information regarding only one of the audio video information processing unit 101a and the audio video information output unit 102a. The control information includes, for example, information for instructing the audio video information processing unit 101a to obtain the audio video information and to end the obtainment, and information for instructing the audio video information output unit 102a to start and end outputting the audio video information obtained by the audio video information processing unit 101a. To be more specific, the control information receiving unit 103a receives the control information outputted from the output apparatus 20. The control information receiving unit 103 receives the control information which is sent from the control apparatus 20 via a network such as a wired or wireless LAN or via a bus such as a USB or an IEEE1394, for example. The control information receiving unit 103a may or may not include a receiving device for receiving on the network and an interface for communications. The control information receiving unit 103a can be realized by a wired or wireless communication means, a broadcast means, or the like.

The control unit 104a controls at least one of the audio video information processing unit 101a and the audio video information output unit 102a according to the control information. When the control is needed for only one of the audio video information processing unit 101a and the audio video information output unit 102a, the control unit 104a may control only one of them. For example, when the control information is information for instructing the audio video information processing unit 101a and the audio video information output unit 102a to output a menu screen, the control unit 104a performs control to cause the audio video information processing unit 101a to generate video information for displaying the menu and then to cause the audio video information output unit 102a to output this video information. The control unit 104a can usually be realized by an MPU, a memory, or the like. The operating procedure of the control unit 104a can usually be realized by software, and this software is recorded on a recording medium, such as a ROM. However, the procedure may be realized by hardware (a dedicated circuit).

The input setting request information sending unit 105a sends input setting request information for requesting that the audio video supplying apparatus should be set as the input source, to the output apparatus 30. For example, when receiving this input setting request information, the output apparatus 30 sets the audio video supplying apparatus 10a, which sent this input setting request information, as the input source of the audio video information. Usually, the input setting request information sending unit 105*a* sends the input setting request information for requesting that its own apparatus should be set as the input source. The input setting request information sending unit 105*a* may include or add identification information, such as address information including a physical address or an IP address of the audio video supplying apparatus 10*a*, in or to the input setting request information for distinguishing the audio video supplying apparatus 10*a* from the other apparatuses. It does not matter what trigger is used by the input setting request information sending unit 105*a* to send the input setting request information. For example, the input setting request information sending unit 105*a* may judge that the audio video information output unit 102*a* starts outputting the audio video information and may send the input setting request information immediately before the output is started. Moreover, when receiving the control information causing the audio video information output unit 102*a* to output the audio video information, the control unit 104*a* may perform control to cause the input setting request information sending unit 105*a* to send the input setting request information to the output apparatus 30. Usually, the input setting request information sending unit 105*a* sends the input setting request information, requesting that one audio video supplying apparatus should be set as the input source. However, when the output apparatus 30 has a configuration whereby a plurality of pieces of audio video information can be outputted, the input setting request information sending unit 105*a* may send the input setting request information, requesting that the audio video supplying apparatuses which correspond to the outputs in number should be set as the input sources. The input setting request information sending unit 105*a* can be realized by a wired or wireless communication means or the like, and may be realized by a broadcast means. It should be noted that the input setting request information sending unit 105*a* can be omitted in the case, for example, where the output apparatus 30 changes the input destination without being based on the output of the audio video supplying apparatus 10*a*.

The control apparatus 20 includes an instruction receiving unit 201, a determination unit 202, a selection information receiving unit 203, a request information sending unit 204, a control information sending unit 205, and an audio video supplying apparatus 10*b*.

The control apparatus 20 may be any kind of apparatus as long as the apparatus can control another apparatus connected via a network or a bus, for example. Note that this connection may be a wired connection or a wireless connection. An explanation is given here as to a case, as an example, where the control apparatus 20 itself is an apparatus, such as a set-top box, which can output the audio video information to the output apparatus 30 or the like.

The instruction receiving unit 201 receives an instruction given to 10*a* to 10*c* which is to be the input source of the audio video information currently being outputted by the output apparatus 30. To be more specific, this instruction does not need to be an instruction to a specific audio video supplying apparatus. In other words, the instruction does not need to be an instruction designating a specific audio video supplying apparatus. That is to say, this instruction can be considered as an instruction concerning the audio video information currently being outputted. The instruction received by the instruction receiving unit 201 is an instruction to start, end, or adjust the output of the audio video information, for example. An input means of the instruction may be anything, such as a numeric keypad, a keyboard, a mouse, or something through the use of a menu screen. For example, the instruction receiving unit 201 receives the instruction given to the audio video supplying apparatus 10*a* to 10*c* via a remote control apparatus (not illustrated). It should be noted that when the instruction receiving unit 201 receives the instruction, it is only necessary to know that the instruction is given to the audio video supplying apparatus 10*a* to 10*c* which is the input source of the audio video information currently being outputted by the output apparatus 30, and it is thus unnecessary to identify which audio video supplying apparatus the instruction is given to. The instruction receiving unit 201 can be realized by a device driver of the input means, such as a numeric keypad or a keyboard, or by control software of a menu screen. It should be noted that the instruction receiving unit 201 may receive an instruction given not only to the audio video supplying apparatus that is currently performing output, but to a specific appliance as well. For example, regardless of whether or not the output apparatus 30 is currently outputting the audio video information outputted by the audio video supplying apparatus 10*a*, the instruction receiving unit 201 may receive an instruction to be given to the audio video supplying apparatus 10*a* to turn the power on or to display a menu.

The determination unit 202 determines the audio video supplying apparatus 10*a* to 10*c* to be the input source of the audio video information currently being outputted by the output apparatus 30. To be more specific, on the basis of selection information sent from the output apparatus 30, the determination unit 202 determines which one of the audio video supplying apparatuses 10*a* to 10*c* is the input source of the audio video information currently being outputted by the output apparatus 30. The selection information is information designating the audio video supplying apparatus selected as the input source by the output apparatus 30. For example, information including identification information such as address information like a physical address or an IP address of the audio video supplying apparatus 10*a* to 10*c* can be used. For instance, obtaining the identification information such as the address information included in such selection information is considered as "determination" performed by the determination unit 202. However, when the audio video supplying apparatus 10*b* inside the control unit 20 is outputting the audio video information, the determination unit 202 may determine the audio video supplying apparatus 10*b* inside the control unit 20 to be the input source, without performing the determination based on the selection information as described above. It does not matter what timing or what trigger is used for the above-described determination performed by the determination unit 202. The determination unit 202 may perform the above-described determination at regular or irregular time intervals. Or, when the selection information receiving unit 203 receives the selection information, the determination unit 202 may perform the above-described determination on the basis of the received selection information. The determination unit 202 can usually be realized by an MPU, a memory, or the like. The operating procedure of the determination unit 202 can usually be realized by software, and this software is recorded on a recording medium, such as a ROM. However, the procedure may be realized by hardware (a dedicated circuit).

The selection information receiving unit 203 receives the selection information sent from the output apparatus 30. The selection information receiving unit 203 can be realized by a wireless or wired communication means or the like, and can also be realized by a means of receiving broadcasts.

The request information sending unit 204 sends selection information request information for requesting the selection information. The request information sending unit 204 may send the request information to the output apparatus 30 when the instruction receiving unit 201 receives an instruction of some kind or a specific instruction. Or, the request information sending unit 204 may send the request information to the output apparatus 30 at regular or irregular time intervals. It does not matter what timing or what trigger is used for sending the request information. However, when the audio video supplying apparatus 10b inside the control apparatus 20 is outputting the audio video information, the request information sending unit 204 may not send the request information. The request information sending unit 204 can be realized by a wireless or wired communication means or the like, and can also be realized by a means of receiving broadcasts.

The control information sending unit 205 sends the control information corresponding to the instruction received by the instruction receiving unit 201, to one of the audio video supplying apparatuses 10a to 10c that is determined by the determination unit 202 to be the input source of the audio video information currently being outputted by the output apparatus 30. The control information corresponding to the instruction received by the instruction receiving unit 201 may be control information interpreted only by a specific apparatus, or may be control information interpreted by an indefinite number of apparatuses, such as apparatuses satisfying a predetermined standard. To be more specific, suppose that the instruction received by the instruction receiving unit 201 is an instruction "UP". In this case, the control information sending unit 205 may send this instruction "UP" as control information "up". Or, the control information sending unit 205 may send control information corresponding to the instruction "UP" to all the apparatuses satisfying the predetermined standard, that is, the control information may be converted into control information "up" for example. Alternatively, the control information sending unit 205 may convert the information into control information "scroll_up" which can be interpreted and executed only by a specific apparatus, such as the audio video supplying apparatus 10a. For the case where the instruction received by the instruction receiving unit 201 is converted into the control information, it is necessary for the control information sending unit 205 or the like to previously obtain and store a table or the like which defines a correspondence relation between an instruction received by the instruction receiving unit 201 and control information converted from this instruction, into a storage medium, such as a memory. For example, the control information sending unit 205 may manage and store the instruction received by the instruction receiving unit 201 and the control information as attribute values making up one record, into a database or the like existing in a memory or the like. It does not matter how the control information sending unit 205 outputs the control information to the audio video supplying apparatus determined by the determination unit 202. For example, the control information sending unit 205 may send the control information to a destination designated as an address on the network, such as an IP address, or a physical address of the audio video supplying apparatus determined by the determination unit 202. Or, the identification information of the audio video supplying apparatus determined by the determination unit 202 may be added to or embedded into the control information, so that only the audio video supplying apparatus having this same identification information can receive this control information. Alternatively, the control information sending unit 205 may send the control information which has been encrypted, for example, in such a way that only the audio video supplying apparatus determined by the determination unit 202 can decode. The IP address, the identification information, and so forth described above can be obtained from the selection information and the like received by the selection information receiving unit 203. The control information sending unit 205 may or may not include a sending device for sending on the network or the like and an interface for communications. The control information sending unit 205 may be realized by hardware, or may be realized by software, such as a driver for driving the sending device and the like. The control information sending unit 205 can be realized by a wired or wireless communication means, a broadcast means, or the like. Moreover, as a structure for obtaining the control information corresponding to the instruction received by the instruction receiving unit 201, an MPU, a memory, or the like may be included. Such operating procedure can usually be realized by software, and this software is recorded on a recording medium, such as a ROM. However, the procedure may be realized by hardware (a dedicated circuit). It should be noted that when the instruction receiving unit 201 receives an instruction to be given to a specific apparatus, the control information sending unit 205 outputs the control information corresponding to this instruction to the specific apparatus relating to the instruction received by the instruction receiving unit 201.

The audio video supplying apparatus 10b may be any kind of apparatus as long as the apparatus can output the audio video information to the output apparatus 30 or the like. The audio video supplying apparatus 10b includes an audio video information processing unit 101b, an audio video information output unit 102b, a control information receiving unit 103b, a control unit 104b, and an input setting request information sending unit 105b. The audio video information processing unit 101b, the audio video information output unit 102b, the control information receiving unit 103b, the control unit 104b, and the input setting request information sending unit 105b respectively have the same configurations as the audio video information processing unit 101a, the audio video information output unit 102a, the control information receiving unit 103a, the control unit 104a, and the input setting request information sending unit 105a. Therefore, the detailed explanations are omitted here. However, although the audio video information processing unit 101b performs processing on the audio video information as is the case with the audio video information processing unit 101a, the audio video information processing unit 101b may perform the same processing performed by the audio video information processing unit 101a or may perform different processing.

The output apparatus 30 includes an input selecting unit 301, a request information receiving unit 302, a selection information sending unit 303, an audio video information input unit 304, an audio video output unit 305, a first input setting request information receiving unit 306, and the audio video supplying apparatus 10c. The output apparatus 30 may be any kind of apparatus as long as the apparatus can output, or equivalently display for example, the audio video information outputted by the audio video supplying apparatuses 10a to 10c, such as a TV, a projector, and a monitor.

The input selecting unit 301 selects one or more audio video supplying apparatuses and, in this case here, selects one of the audio video supplying apparatuses 10a to 10c. To be more specific, the input selecting unit 301 selects the audio video supplying apparatus which is the input source of the audio video information outputted by the output apparatus 30. It does not matter how the input selecting unit 301 determines on the audio video supplying apparatus to be selected. For example, the input selecting unit 301 may select the audio video supplying apparatus 10a to 10c which has sent the latest input setting request information, out of the input setting request information sent from the audio video supplying apparatuses 10a to 10c and received by the first input setting request information receiving unit 306 described later. Or, the input setting request information sent from the audio video supplying apparatuses 10a to 10c may always be updated and stored, so that the audio video supplying apparatus 10a to 10c which has sent the input setting request information currently stored or the audio video supplying apparatus 10a to 10c indicated by the present input setting request information may be set as the input source of the audio video information. Moreover, when the input setting request information includes the identification information of the apparatus which requests to be selected as the input source, the identification information and the like included in the input setting request information may be stored instead of storing the input setting request information as described above. Then, on the basis of this identification information instead of the input setting request information, the audio video supplying apparatus to be the input source may be selected. Furthermore, the audio video supplying apparatus designated by an instruction received by a receiving unit or the like, which is not illustrated, may be selected. In this case, it is necessary to previously store information including the identification information regarding the audio video supplying apparatuses to be designated. The input selecting unit 301 can usually be realized by an MPU, a memory, or the like. The operating procedure of the input selecting unit 301 can usually be realized by software, and this software is recorded on a recording medium, such as a ROM. However, the procedure may be realized by hardware (a dedicated circuit).

The request information receiving unit 302 receives the request information sent from the control apparatus 20. The request information receiving unit 302 can be realized by a wireless or wired communication means or the like, and can also be realized by a means of receiving broadcasts.

The selection information sending unit 303 sends the selection information which shows the audio video supplying apparatus selected by the input selecting unit 301, to the control apparatus 20. For example, from the input selecting unit 301 or the like, the selection information sending unit 303 obtains the information, such as the identification information including an address of the audio video supplying apparatus 10a to 10c, which designates the audio video supplying apparatus 10a to 10c selected by the input selecting unit 301. Then, the selection information sending unit 303 generates and sends the selection information as described above. It does not matter what timing or what trigger is used by the selection information sending unit 303 to send the selection information. The selection information sending unit 303 may send the selection information at regular or irregular time intervals. An explanation is given here especially as to a case where the selection information is sent in accordance with reception of the request information sent from the control apparatus 20. The selection information sending unit 303 can be realized by a wired or wireless communication means or the like, and may also be realized by a broadcast means. Moreover, as a structure for generating the selection information, the selection information sending unit 303 may include an MPU, a memory, or the like. The operating procedure for generating such selection information can usually be realized by software, and this software is recorded on a recording medium, such as a ROM. However, the procedure may be realized by hardware (a dedicated circuit).

The audio video information input unit 304 receives the audio video information outputted from the audio video supplying apparatuses 10a to 10c. To be more specific, the audio video information input unit 304 receives the audio video information outputted from the audio video supplying apparatus 10a to 10c selected by the input selecting unit 301. It does not matter how the audio video information input unit 304 selectively receives only the input of the audio video information outputted from the audio video supplying apparatus 10a to 10c selected by the input selecting unit 301. For example, using the identification information or the like added to the audio video information, the audio video supplying apparatus 10a may selectively receive only the audio video information outputted from the audio video supplying apparatus 10a to 10c selected by the input selecting unit 301, out of the audio video information outputted by the audio video supplying apparatuses 10a to 10c. Or, the audio video information input unit 304 may have a plurality of input interfaces respectively connected to the audio video supplying apparatuses 10a to 10c, and may receive only the input from the interface that is connected to the audio video supplying apparatus 10a to 10c selected by the input selecting unit 301. The audio video information input unit 304 may or may not include: a receiving device for receiving information on the network or the like; an interface for communications; and an interface for signal input. The audio video information input unit 304 can be realized by a wired or wireless communication means, a broadcast means, or the like.

The audio video output unit 305 outputs the audio video information. To be more specific, the audio video output unit 305 outputs the audio video information received by the audio video information input unit 304. The audio video output unit 305 may or may not be considered to include an output device, such as a display or a speaker. The output unit can be realized by: driver software of the output device; or the driver software of the output device and the output device. Output is a term which refers to a concept that includes displaying on the display, outputting audio, and sending to an external apparatus.

The first input setting request information receiving unit 306 receives the above mentioned input setting request information. The first input setting request information receiving unit 306 can be realized by a wired or wireless communication means or the like, and may be realized by a broadcast means.

The audio video supplying apparatus 10c may be any kind of apparatus as long as the apparatus can output the audio video information to the output apparatus 30 and, especially in this case, to the audio video information input unit 304. The audio video supplying apparatus 10c includes an audio video information processing unit 101d, an audio video information output unit 102c, a control information receiving unit 103c, a control unit 104c, and an input setting request information sending unit 105c. The audio video information processing unit 101c, the audio video information output unit 102c, the control information receiving unit 103c, the control unit 104c, and the input setting request information sending unit 105c respectively have the same configurations as the audio video information processing unit 101a, the audio video information output unit 102a, the control information receiving unit 103a, the control unit 104a, and the input setting request information sending unit 105a. Therefore, the detailed explanations are omitted here. However, although the audio video information processing unit 101c performs processing on the audio video information as is the case with the audio video information processing unit 101a, the audio video information processing unit 101b may perform the same processing performed by the audio video information processing unit 101a or may perform different processing.

Figure 2:
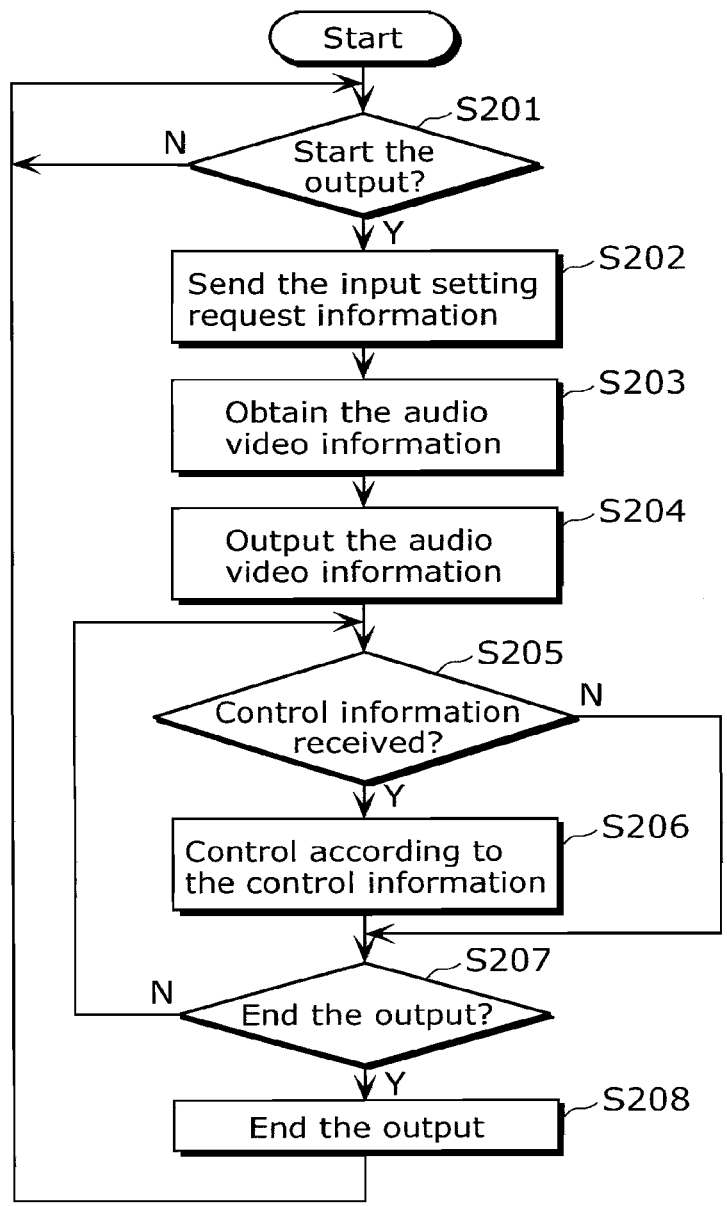
FIG. 2 is a flowchart for explaining an operation of an audio video supplying apparatus according to the first embodiment.

Next, an operation performed by the audio video supplying apparatus 10a is explained, with reference to the flowchart of FIG. 2.

(Step S201) The control unit 104a decides whether or not to start the output of the audio video information. It does not matter what timing or what trigger is used by the control unit 104a for deciding whether or not to start the output of the audio video information. For example, the control unit 104a decides to start the output of the audio video information, using the power-on of the audio video supplying apparatus 10a as a trigger. Moreover, when the control information receiving unit 103a or the like receives the control information instructing the output of the audio video information from another apparatus, the control unit 104a may decide to start the output of the audio video information. When deciding to start the output, the control unit 104a proceeds to Step S202. When deciding not to start the output, the control unit 104a returns to Step S201.

(Step S202) The control unit 104a performs control to cause the input setting request information sending unit 105a to output the input setting request information requesting that the audio video supplying apparatus 10a should be set as the input source of the audio video information. With this control, the input setting request information sending unit 105a outputs the input setting request information.

(Step S203) The control unit 104a performs control to cause the audio video information processing unit 101a to obtain the audio video information. With this control, the audio video information processing unit 101a obtains the audio video information. The audio video information which the control unit 104a causes the audio video information processing unit 101a to obtain does not matter. For example, the control unit 104a causes the audio video information processing unit 101a to perform processing of reading the audio video information previously stored in a storage medium (not illustrated) such as a memory, and to accordingly obtain the audio video information. Or, the control unit 104a may cause the audio video information processing unit 101a to create, on the basis of information stored in a storage medium (not illustrated) such as a memory, audio video information used for displaying a menu screen or the like of the audio video supplying apparatus 10a, so as to accordingly obtain the audio video information. Moreover, when an instruction to output predetermined audio video information is received in Step S201 or the like, for example, the designated audio video information may be obtained. It does not matter whether the audio video information which the control unit 104a causes the audio video information processing unit 101a to obtain is previously set or arbitrary. In this case here, the audio video information obtained by the audio video information processing unit 101a is used for displaying a menu screen or the like set by default, for example.

(Step S204) The control unit 104a causes the audio video information output unit 102a to output the audio video information obtained by the audio video information processing unit 101a. With this control, the audio video information output unit 102a outputs the audio video information obtained by the audio video information processing unit 101a.

(Step S205) The control information receiving unit 103a judges whether or not the control information has been received. When the control information has been received, the processing proceeds to Step S206. When the control information has not received, the processing proceeds to Step S207.

(Step S206) The control unit 104a causes the audio video information processing unit 101a and the audio video information output unit 102a to perform the processing corresponding to the control information received in Step S205. With this control, the audio video information processing unit 101a and the audio video information output unit 102a perform the processing corresponding to the control information. For example, when the control information indicates an instruction to output predetermined audio video information stored in a memory or a storage medium (not illustrated), the control unit 104a causes the audio video information processing unit 101a to obtain the audio video information designated by this control information and causes the audio video information output unit 102a to output this obtained audio video information. It should be noted that when the control information indicates an instruction to end the output of the audio video information being outputted by the audio video information output unit 102a, this step is ignored. As the processing corresponding to the control information in the case where the audio video information supplying apparatus 10a is a TV tuner, it is conceivable that the processing may be performed for switching the channel so as to change the program to be obtained. Moreover, in the case where the audio video supplying apparatus 10a is a DVD recorder or a hard disk recorder, it is conceivable that the processing may be performed for selecting and reading content stored in a DVD or a hard disk.

(Step S207) The control unit 104a judges whether or not to end the output of the audio video information. For example, when the control information received in Step S205 includes an instruction to end the output currently being performed by the audio video information output unit 102a, the control unit 104a may decide to end the output. Moreover, when the audio video information processing unit 101a and the audio video information output unit 102a completely finish outputting the audio video information designated by the control information or the like, the control unit 104a may decide to end the output. When the output is to be ended, the processing proceeds to Step S208. When the output is not to be ended, the processing returns to Step S205.

(Step S208) The audio video information output unit 102a ends the output of the audio video information. Then, the processing returns to Step S201.

It should be noted that the processing is terminated by an interrupt due to a power-off or an end of the processing.

Figure 3:
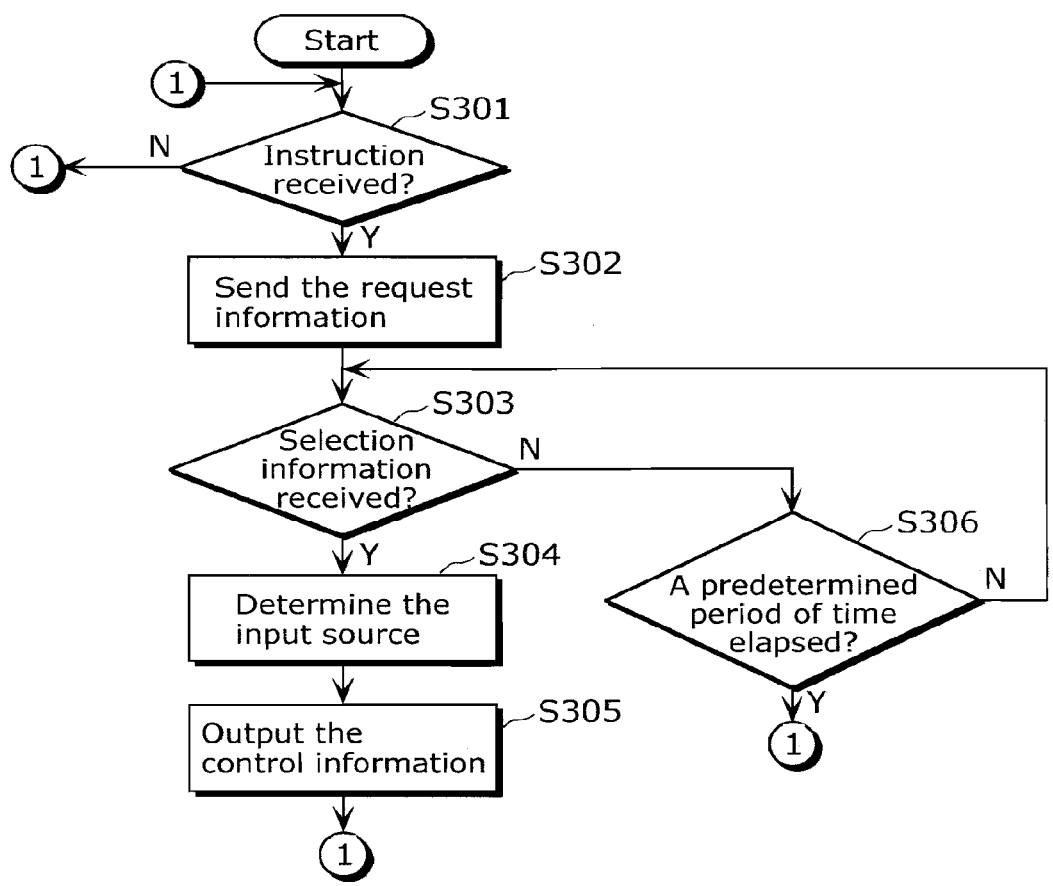
FIG. 3 is a flowchart for explaining an operation of a control apparatus according to the first embodiment.

Next, an operation performed by the control apparatus 20 is explained, with reference to the flowchart of FIG. 3. Note that an operation performed by the audio video supplying apparatus 10b included in the control apparatus 20 is the same as the operation performed by the audio video supplying apparatus 10a described above and, therefore, the explanation is omitted here.

(Step S301) The instruction receiving unit 201 judges whether or not to have received an instruction given to the audio video supplying apparatus 10a to 10c which is the input source of the audio video information currently being outputted by the output apparatus 30. When the instruction has been received, the processing proceeds to Step S302. When the instruction has not been received, the processing returns to Step S301.

(Step S302) The request information sending unit 204 outputs the request information to the output apparatus 30.

(Step S303) The selection information receiving unit 203 judges whether or not to have received the selection information sent from the output apparatus 30 in response to the request information outputted in Step S304. When the selection information has been received, the processing proceeds to Step S304. When the selection information has not been received, the processing proceeds to Step S306.

(Step S304) The determination unit 202 determines which one of the audio video supplying apparatuses 10a to 10c is the input source of the audio video information currently being outputted by the output apparatus 30, on the basis of the selection information received by the selection information receiving unit 203 in Step S303.

(Step S305) The control information sending unit 205 outputs the control information corresponding to the instruction received in Step S301, to one or more of the audio video supplying apparatuses 10a to 10c determined by the determination unit 202 in Step S304. Then, the processing returns to S301.

(Step S306) The selection information receiving unit 203 judges whether or not a predetermined period of time has elapsed after the request information sending unit 204 outputted the request information. When the predetermined period of time has elapsed, the processing returns to Step S301. When the predetermined period of time has not elapsed, the processing returns to Step S303.

It should be noted that the following processing may be performed between Step S301 and Step S302. The determination unit 202 may judge whether or not the audio video supplying apparatus 10b is the input source of the audio video information currently being outputted by the output apparatus 30, from an output state of the audio video information of the audio video supplying apparatus 10b. Then, when the audio video supplying apparatus 10b is the input source, the control information corresponding to the instruction received in Step S301 may be sent to the control information receiving unit 103b of the audio video supplying apparatus 10b which is the audio video supplying apparatus included in its own apparatus. When the audio video supplying apparatus 10b is not the input source, the processing may proceeds to Step S302. From the output state of the audio video information of the audio video supplying apparatus 10b, it may be judged, according to the following way, that the audio video supplying apparatus 10b is the input source of the audio video information being outputted by the output apparatus 30. For example, when the audio video supplying apparatus 10b is outputting the audio video information, the control unit 104b of the audio video supplying apparatus 10b may output information indicating that the audio video supplying apparatus 10b is supplying the audio video information, to the determination unit 202 at a predetermined regular or irregular timing. Then, the determination unit 202 may judge whether or not the information indicating that the audio video supplying apparatus 10b is supplying the audio video information has been received from the control unit 104b of the audio video supplying apparatus 10b. Only when the information has been received, the determination unit 202 may determine that the audio video supplying apparatus 10b is the output source. Alternatively, the determination unit 202 may output an instruction inquiring of the control unit 104b of the audio video supplying apparatus 10b whether or not the audio video supplying apparatus 10b is supplying the audio video information. Then, according to the information, which is obtained from the control unit 104b in response to this instruction, as to whether or not the audio video supplying apparatus 10b is supplying the audio video information, the determination unit 202 may judge whether or not the audio video supplying apparatus 10b is the input source.

It should be noted that the processing of the flowchart in FIG. 3 is terminated by an interrupt due to a power-off or an end of the processing.

Figure 4:
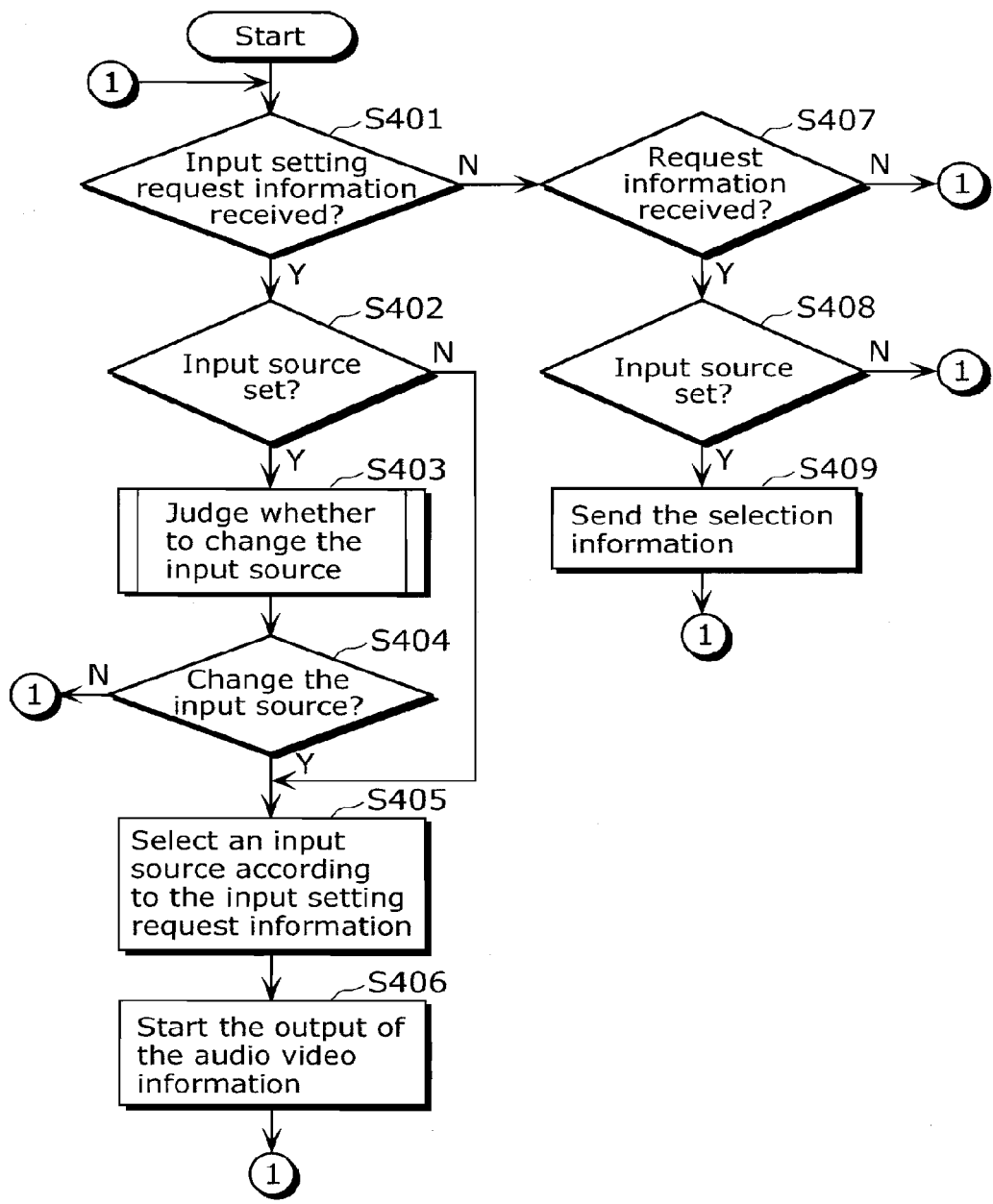
FIG. 4 is a flowchart for explaining an operation of an output apparatus according to the first embodiment.

Next, an operation performed by the output apparatus 30 is explained, with reference to the flowchart of FIG. 4. Note that an operation performed by the audio video supplying apparatus 10c included in the control apparatus 20 is the same as the operation performed by the audio video supplying apparatus 10a described above and, therefore, the explanation is omitted here.

(Step S401) The first input setting request information receiving unit 306 judges whether or not to have received the input setting request information. When the input setting request information has been received, the processing proceeds to Step S402. When the input setting request information has not been received, the processing proceeds to Step S407.

(Step S402) The input selecting unit 301 judges whether or not the input source of the audio video information is set. For example, the input selecting unit 301 judges whether or not information for setting the input source is stored in a memory or the like. When the information is set, the processing proceeds to Step S403. When the information is not set, the processing proceeds to Step S405.

(Step S403) The input selecting unit 301 performs processing of judging whether or not to change the input source of the audio video information, according to the input setting request information received in Step S401. For example, when the input setting request information received in Step S401 is for setting the same audio video supplying apparatus as the one which is currently set as the input source, the input selecting unit 301 decides not to change the input source. When the input setting request information is for setting the audio video supplying apparatus other than the one which is currently set as the input source, the input selecting unit 301 decides to change the input source. Alternatively, the input setting request information which is most recently inputted may be stored into a memory or the like. Then, when both the input setting request information received in Step S401 and the most-recently-inputted input setting request information are for setting the same audio video supplying apparatus as the input source, the input selecting unit 301 may decide not to change the input. When these pieces of the information are for setting different audio video supplying apparatuses, the input selecting unit 301 may decide not to change the input. Note that a specific example of this processing is described later.

(Step S404) The input selecting unit 301 judges whether or not the result of the judgment processing in Step S403 shows that the input source is to be changed. When the result shows that the input source is to be changed, the processing proceeds to Step S405. When it is judged that the result does not show that the input source is to be changed, the processing returns to Step S401.

(Step S405) The input selecting unit 301 selects the input source of the audio video information, according to the input setting request information received in Step S401. To be more specific, the input selecting unit 301 sets the audio video supplying apparatus requested in the input setting request information received in Step S401, as the input source of the audio video information.

(Step S406) The audio video information input unit 304 starts receiving the input of the audio video information from the audio video supplying apparatus selected in Step S405. The audio video output unit 305 starts outputting the audio video information to be inputted into the audio video information input unit 304. Then, the processing returns to Step S401.

(Step S407) The request information receiving unit 302 judges whether or not to have received the request information. When the request information has been received, the processing proceeds to Step S408. When the request information has not been received, the processing returns to Step S401.

(Step S408) The selection information sending unit 303 judges whether or not the input source of the audio video information has been selected. When the input source has been selected, the processing proceeds to Step S409. When the input source has not been selected, the processing returns to Step S401.

(Step S409) The selection information sending unit 303 generates the selection information showing the audio video supplying apparatus selected as the input source by the selection unit 301 and sends this information to a sender of the request information, that is, to the control apparatus 20 in this case. Then, the processing returns to Step S401.

In the flowchart of FIG. 4, the input source is selected from among the audio video supplying apparatuses 10a to 10c according to the input setting request information. However, a receiving unit or the like, which is not illustrated, may receive an instruction designating the audio video supplying apparatus 10a to 10c as the input source, so that the input selecting unit 301 may select the audio video supplying apparatus as the input source according to this instruction, without using the input setting request information.

It should be noted that the processing of the flowchart in FIG. 4 is terminated by an interrupt due to a power-off or an end of the processing.

Figure 5:
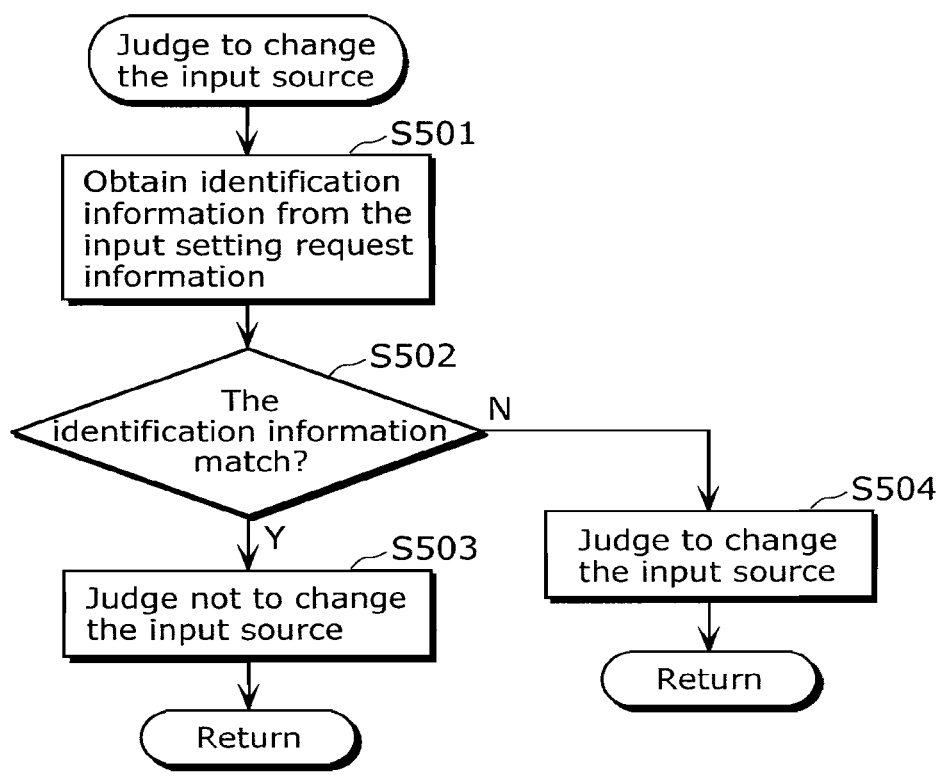
FIG. 5 is a flowchart for explaining a judgment as to whether to change an input source of the output apparatus, according to the first embodiment.

Next, a specific example of the processing performed in Step S403 of FIG. 4 is explained, with reference to a flowchart of FIG. 5. It should be noted here that the input setting request information includes the identification information of the apparatus requested to be set as the input source by this input setting request information, that is, the identification information of the audio video supplying apparatus 10a to 10c. Also note that, in the processing performed in Step S401 of FIG. 4, the identification information of the apparatus set as the input source is stored in a storage medium such as a memory (not illustrated) of the output apparatus 30.

(Step S501) The input selecting unit 301 obtains the identification information from the input setting request information received by the first input setting request information receiving unit 306.

(Step S502) The input selecting unit 301 judges whether or not the identification information obtained in Step S501 matches the identification information already stored in the memory or the like. When these pieces of the information match with each other, the processing proceeds to Step S503. When these pieces of the information do not match with each other, the processing proceeds to Step S504.

(Step S503) The input selecting unit 301 judges, or equivalently, decides not to change the input source of the audio video information and then returns to a higher-level function.

(Step S504) The input selecting unit 301 judges, or equivalently, decides to change the input source of the audio video information and then returns to a higher-level function.

When the processing as shown in FIG. 5 is performed, Step S405 of FIG. 4 is performed as follows. The apparatus corresponding to the identification information included in the input setting request information received in Step S401 is selected as the apparatus serving as the input source, and then this identification information is stored in the above-mentioned memory or the like.

The following is an explanation about a specific operation performed by the audio video system according to the present embodiment. A conceptual diagram of the audio video system is shown in FIG. 6. For the present specific example, an explanation is given as to a case where: the audio video supplying apparatus 10a is a DVD recorder; the control apparatus 20 is a set-top box for a cable television; and the output apparatus 30 is a TV. Suppose that the output apparatus 30 includes a display 32 as an output device. Also suppose that the audio video supplying apparatus 10b is a tuner of the control apparatus 20 to which the audio video information of the cable television is inputted, and that the audio video supplying apparatus 10c is a tuner of the output apparatus 30 connected to an antenna or the like. Note that the audio video supplying apparatus 10b and the audio video supplying apparatus 10c may be a DVD player and a VTR built into a TV and a set-top box. Moreover, suppose that the control apparatus 20 can be operated through a remote 40. Suppose in this case here that all the apparatuses are connected via a network, for example, for communication with each other. Also suppose that each piece of the identification information of the audio video supplying apparatuses 10a to 10c is a physical address of the apparatus. As an example, the identification information of the audio video supplying apparatus 10a is "FF123456", the identification information of the audio video supplying apparatus 10b is "BB678910", and the identification information of the audio video supplying apparatus 10c is "CC876543".

The remote 40 includes an "up" key 41, a "right" key 42, a "down" key 43, a "left" key 44, an "enter" key 45, a "return" key 46, a "play" key 48, and a "stop" key 49. Note that the "up" key 41, the "right" key 42, the "down" key 43, the "left" key 44, the "enter" key 45, and the "return" key 46 are used for operating the audio video supplying apparatuses 10a to 10c which are to be the input sources of the audio video information outputted by the output apparatus 30. The keys like these which can give common instructions to a plurality of apparatuses are referred to here as primary keys. Also, the keys such as the "play" key 48 and the "pause" key 49, which can be used only for an apparatus having a specific function or an apparatus belonging to a specific group, are referred to here as function keys.

It should be noted here that, in addition to the primary keys and the function keys described above, the remote 40 includes a key (not illustrated) for instructing each apparatus to turn on and off the power and a key (not illustrated) for instructing each apparatus to start the output. By pushing such key, an instruction for turning the power on or off, or an instruction for starting the output is sent from the remote 40 to the apparatus corresponding to the pushed key. As the remote 40 like this, any kind of remote can be used as long as the remote can instruct each apparatus to turn on and off the power and to perform the output. For example, a remote which can read key codes or the like for giving the apparatus instructions to turn on and off the power and to start the output can be used as the remote 40. It should be noted that a configuration as just described whereby a plurality of apparatuses can be operated using a single remote is a well-known technology and, therefore, the explanation is omitted.

Moreover, the instructions given to the apparatus to turn on and off the power and to start the output do not necessarily issued using the remote 40 described above. For example, each apparatus may include a power button or the like, so that the power can be turned on and off with the push of this button. Also, each apparatus may include buttons, such as a menu output button and a play button, for performing the output, so that the apparatus may receive the instructions to start the menu output and the playback output with the push of these buttons. Moreover, using a timer or the like, the power may be turned on automatically and the output or the like may be started at a time set by a user or the like.

First, suppose that the user turns on the power of the control apparatus 20, which is a set-top box, and the output apparatus 30, which is a TV, by operating the remote 40. A signal outputted in response to the key operation from the remote 40 is sent via infrared, for example. Then, each of the control apparatus 20 and the output apparatus 30 receives this signal and turns on the power. In this case here, suppose that the control apparatus 20, the output apparatus 30, and the like has such a configuration as to operate according to the key code like this. It should be noted that a configuration whereby an apparatus which can receive and interpret the key code of the remote 40 is operated through the operation of the remote 40 is a well-known technology and, therefore, the explanation is omitted. Suppose here that the audio video supplying apparatus 10a, which is a DVD player, is in a so-called standby state and can be turned on by a signal or the like from the remote 40 or another apparatus.

Suppose that the control unit 104b of the audio video supplying apparatus 10b of the control apparatus 20 holds information regarding a channel such as "108" which was being outputted when the power was turned off the last time, in a memory or the like (not illustrated). First, when the power is turned on, the control unit 104b of the audio video supplying apparatus 10b causes the input setting request information sending unit 105b of the audio video supplying apparatus 10b to send the input setting request information in order for its own apparatus to be set as the input source. This input setting request information includes the identification information "BB678910" of the audio video supplying apparatus 10b. Next, on the basis of the above-mentioned information regarding the channel, the channel such as the channel "108" which was being outputted the last time by the audio video information processing unit 101b is selected and the audio video information broadcasted on this channel is obtained. Then, the audio video information output unit 102b of the audio video supplying apparatus 10b outputs the audio video information of the channel "108" obtained by the audio video information processing unit 101b to the output apparatus 30.

When the first input setting request information receiving unit 306 of the turned-on output apparatus 30 receives the input setting request information sent from the audio video supplying apparatus 10b of the control apparatus 20, the input selecting unit 301 selects the apparatus represented by the identification information "BB678910" included in the input setting request information, that is, the audio video supplying apparatus 10b in this case here, as the input source of the audio video information. Then, the audio video information input unit 304 receives the audio video information, as the input, sent from the audio video information output unit 102b of the audio video supplying apparatus 10b, and the audio video output unit 305 outputs the received audio video information to the display 32.

To be more specific, as an example in this case here, the audio video supplying apparatus 10b of the control apparatus 20 outputs the audio video information which includes its own identification information "BB678910" in a header or the like. Also, supposing that the identification information in the memory (not illustrated) of the output apparatus 30 is deleted at power-on, the audio video information input unit 304 stores the identification information "BB678910" of the audio video supplying apparatus 10b included in the input setting request information, into the memory of the output apparatus 30. Then, the audio video information input unit 304 reads the identification information "BB678910" of the audio video supplying apparatus 10b of the present control apparatus 20 from the memory, receives only the audio video information, as the input, which includes the same identification information as "BB678910" of the audio video supplying apparatus 10b of this control apparatus 20 in its header or the like, and abandons other audio video information. Thus, the audio video information input unit 304 of the output apparatus 30 can selectively receive only the audio video information outputted from the audio video supplying apparatus 10b of the control apparatus 20, and can output the audio video information outputted from the audio video supplying apparatus 10b of the control apparatus 20. In this way, the audio video information input unit 304 of the output apparatus 30 receives the audio video information from the apparatus 30 which is the input source selected by the input selecting unit 301, that is, the audio video supplying apparatus 10b in this case, and then the audio video output unit 305 outputs the received audio video information to the display 32.

It should be noted that when the audio video supplying apparatuses 10a to 10c are connected to line input terminals of the output apparatus 30, for example, the identification information such as physical addresses of the audio video supplying apparatuses 10a to 10c may be set to the line input terminals respectively. Then, the audio video information input unit 304 may selectively receive the input from the line input terminal to which the identification information matching the identification information of the audio video supplying apparatus 10b selected as the input source by the input selecting unit 301 is set.

Figure 7:
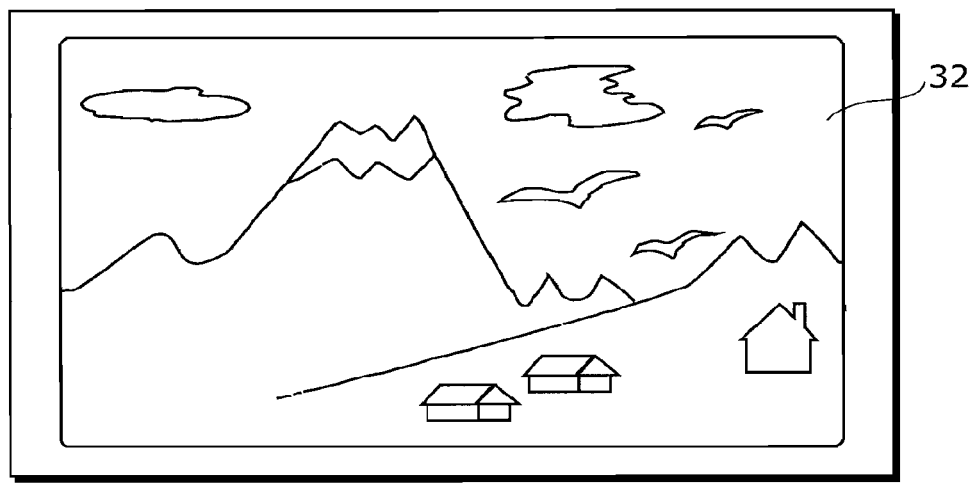
FIG. 7 shows an example of display according to the first embodiment.

FIG. 7 shows an example of display of the audio video information, shown by the display 32, which is outputted from the audio video supplying apparatus 10b of the control apparatus 20. In this example, a program of the channel "108" is displayed.

FIG. 8 shows a control information management table for managing: the instructions received by the instruction receiving unit 201 of the control apparatus 20 from the primary keys of the remote 40; and the control information outputted by the control information sending unit 205. This control information management table is stored in a memory or the like which is not illustrated. "Instruction" refers to an instruction received by the instruction receiving unit 201. "Control information" refers to control information outputted from the control information sending unit 205 in response to the instruction received by the instruction receiving unit 201.

Next, when the user pushes the "up" key 41 of the remote 40 in order to change the channel, the instruction receiving unit 201 of the control apparatus 20 receives the instruction "UP". Following this, the request information sending unit 204 sends the request information to the output apparatus 30. When the request information receiving unit 302 of the output apparatus 30 receives the request information, the selection information sending unit 303 reads, from the memory or the like, the identification information "BB678910" of the audio video supplying apparatus 10b presently selected by the input selecting unit 301 as the input source and sends the selection information including this identification information to the control apparatus 20. When the selection information receiving unit 203 of the control apparatus 20 receives this selection information, the determination unit 202 determines the input source of the audio video information being outputted by the output apparatus 30, on the basis of the selection information. To be more specific, in this case here, the identification information "BB678910" included in the selection information is obtained as information regarding a result of the determination of the input source. Here, the physical address is used as the identification information in this case. Thus, the control information sending unit 205 designates, as a destination, the identification information "BB678910" of the audio video supplying apparatus 10b obtained as the determination result, and sends the control information "up" corresponding to the instruction "UP" according to the control information management table shown in FIG. 8. Note that it may be judged, in the audio video supplying apparatus 10b, whether or not the physical address which is to be the destination of the audio video information is the physical address of the audio video supplying apparatus 10b of its own apparatus. Then, when the physical addresses are identical, instead of sending the control information by designating the physical address as the destination, the control information sending unit 205 may send the control information directly to the control information receiving unit 103*b* of the audio video supplying apparatus 10*b* by bypassing the network or the like.

FIG. 9 shows a control management table for managing a relation between: the control information received by the control information receiving unit 103*b* of the audio video supplying apparatus 10*b*; and the control performed on the audio video information processing unit 101*b* by the control unit 104*b*. The control management table includes attributes "Control information", "State", and "Control". "Control information" refers to control information received by the control information receiving unit 103*b* of the audio video supplying apparatus 10*b*, and is the same as the control information shown in FIG. 8. "State" refers to a state of the audio video supplying apparatus 10*b*, and shows what processing is being performed by the audio video information processing unit 101*b*, for example. "Control" refers to the control information outputted to the audio video information processing unit 101*b*. Note that, however, this control management table manages only records which have, as the attributes "Control information", the control information corresponding to the primary keys of the remote 40.

The control unit 104*b* controls the audio video information processing unit 101*b* according to the control information "up" received by the control information receiving unit 103*b*. To be more specific, the control unit 104*b* judges that the audio video supplying apparatus 10*b* is currently outputting the audio video information which is currently on air, or equivalently, judges that the audio video supplying apparatus 10*b* is "Currently outputting broadcast". Then, the control unit 104*b* searches the control management table shown in FIG. 9 for a record which satisfies conditions that "State" is "Currently outputting broadcast" and that "Control information" is "up". Then, the control information "channel_up" which represents the attribute "Control" of this record is sent to the audio video information processing unit 101*b*. Note that "channel_up" is the control information causing the audio video information processing unit 101*b* to execute the processing of "increasing the channel number".

As a result, the audio video information processing unit 101*b* changes the channel from the channel "108" to one channel up, i.e., the channel "109" according to the control information "channel_up", and obtains audio video information of a program broadcasted on the channel "109". Accordingly, the obtained audio video information is outputted from the audio video information output unit 102*b*, and the output apparatus 30 which receives this audio video information, as the input, outputted from the audio video supplying apparatus 10*b* outputs the program of the channel "109" to the display 32.

The control information received by the control information receiving unit 103*b* is converted in accordance with the state of the audio video supplying apparatus 10*b* and then is given to the control unit 104*b* in this case here. However, when such a change made in accordance with the state of the audio video supplying apparatus 10*b* is unnecessary, the conversion of the control information using the control management table or the like as described above may be omitted. This will be the same in the other embodiment.

Next, suppose that the power of the audio video supplying apparatus 10*a*, which is a DVD player, is turned on through an operation of the remote 40. Note that, as an initial setting, the audio video supplying apparatus 10*a* is set so as to display an operation menu at power-on. First, when the power is turned on, the control unit 104*a* of the audio video supplying apparatus 10*a* causes the input setting request information sending unit 105*a* of the audio video supplying apparatus 10*a* to send the input setting request information in order for its own apparatus to be set as the input source. This input setting request information includes the identification information "FF123456" of the audio video supplying apparatus 10*a*. Next, on the basis of the above-mentioned initial setting for displaying the operation menu, the control unit 104*a* of the audio video supplying apparatus 10*a* causes the audio video information processing unit 101*a* to generate the audio video information of the operation menu. To be more specific, the audio video information processing unit 101*a* generates a menu including a list of content items of the audio video information stored in a DVD. Then, the audio video information output unit 102*a* outputs the audio video information of the operation menu generated by the audio video information processing unit 101*a*. Here, as an example, the audio video supplying apparatus 10*a* outputs the audio video information of the operation menu, with the information including its own identification information "FF123456" in a header or the like.

Figure 10:
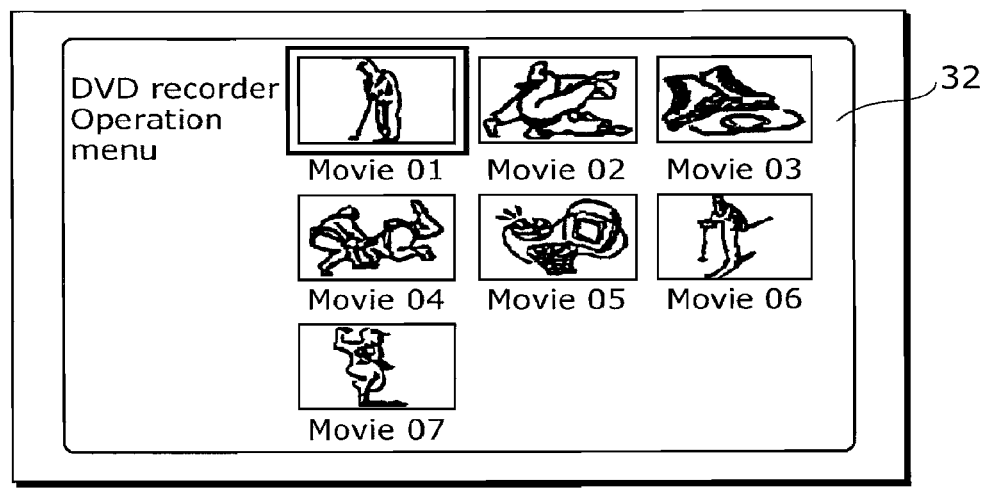
FIG. 10 shows an example of display according to the first embodiment.

When the first input setting request information receiving unit 306 of the output apparatus 30 receives the input setting request information sent from the audio video supplying apparatus 10*a*, the input selecting unit 301 judges whether or not the identification information "FF123456" stored in this input setting request information matches the identification information of the apparatus which is the current input source. Here, the identification information currently stored in the memory or the like is the identification information "BB678910" of the audio video supplying apparatus 10*b* as described above, and is thus judged not to match the identification information "FF123456" of the audio video supplying apparatus 10*a* stored in the input setting request information newly inputted. In accordance with this judgment result, the identification information showing the input source that is stored in the memory or the like is rewritten from the identification information "BB5678910" of the audio video supplying apparatus 10*b* which is currently set as the input source to the identification information "FF123456" of the audio video supplying apparatus 10*a*. Then, the apparatus represented by the rewritten identification information "FF123456", namely the audio video supplying apparatus 10*a* in this case here, is selected as a new input source of the audio video information by the input selecting unit 301. As a result, as in the case of receiving the audio video information from the audio video supplying apparatus 10*b* described above, the audio video information input unit 304 receives the audio video information of the operation menu, as the input, which is sent from the audio video information output unit 102*b* of the audio video supplying apparatus 10*a*, and the audio video output unit 305 outputs the received audio video information to the display or the like. FIG. 10 shows an display example of the operation menu of the audio video supplying apparatus 10*a*. Note that, in FIG. 10, a plurality of content items of the audio video information stored in the DVD are arranged as icons on the list, as an example. Also note here that content called "Movie 01" is currently focused, according to the initial setting that is made when the operation menu is generated.

Next, suppose that the user pushes the "right" key 42 to shift the focus to content called "Movie 02" shown on the immediate right side of "Movie 01" which is currently focused, on the operation menu screen currently being outputted as shown in FIG. 10. Then, the instruction receiving unit 201 of the control apparatus 20 receives an instruction "RIGHT". Following this, the request information sending unit 204 sends the request information to the output apparatus 30. When the request information receiving unit 302 of the output apparatus 30 receives the request information, the selection information sending unit 303 reads, from the memory or the like, the identification information "FF123456" of the audio video supplying apparatus 10*a* which is currently selected as the input source by the input selecting unit 301, and then sends the selection information including this identification information to the control apparatus 20. When the selection information receiving unit 203 of the control apparatus 20 receives this selection information, the determination unit 202 determines the input source of the audio video information outputted by the output apparatus 30, on the basis of the selection information. To be more specific, in this case here, the identification information included in the selection information is obtained as information regarding a result of the determination of the input source. Then, the control information sending unit 205 designates, as a destination, the identification information, i.e., the physical address in this case here, of the audio video supplying apparatus 10*b* obtained as the determination result of the input source, and sends the control information "right" corresponding to the instruction "RIGHT" according to the control information management table shown in FIG. 8.

FIG. 11 shows a control management table for managing a relation between: the control information received by the control information receiving unit 103*a* of the audio video supplying apparatus 10*a*; and the control performed on the audio video information processing unit 101*a* by the control unit 104*a*. It should be noted that the attributes or the like in this control management table are the same as in FIG. 9 and, therefore, the explanation is omitted. However, note that this control management table manages records which have, as the attributes "Control information", the control information corresponding to the function keys in addition to the control information corresponding to the primary keys of the remote 40.

The control unit 104*a* of the audio video supplying apparatus 10*a* controls the audio video information processing unit 101*a* according to the control information "right" received by the control information receiving unit 103*a*. To be more specific, the control unit 104*a* judges that the audio video information output unit 102*a* of the audio video supplying apparatus 10*a* is currently outputting the audio video information of the operation menu, or equivalently, judges that the audio video information output unit 102*a* is "Currently outputting menu". Then, the control unit 104*a* searches the control management table shown in FIG. 11 for a record which satisfies conditions that "State" is "Currently outputting menu" and that "Control information" is "right". Then, the control information "move_right" which represents the attribute "Control" of this record is sent to the audio video information processing unit 101*a*. Note that "move_right" is the control information causing the audio video information processing unit 101*a* to execute the processing of "shifting the focus to the immediate right item".

As a result, according to the control information "move_right", the audio video information processing unit 101*a* generates audio video information of a new operation menu in which the focus on the operation menu is shifted to the icon "Movie 02" shown on the immediate right side of the icon "Movie 01". Accordingly, the obtained audio video information is outputted from the audio video information output unit 102*a* of the audio video supplying apparatus 10*a*, and the output apparatus 30 which receives this audio video information, as the input, outputted from the audio video supplying apparatus 10*a* outputs the operation menu screen in which the focus is shifted to "Movie 02" as shown in FIG. 12 to the display 32.

Figure 12:
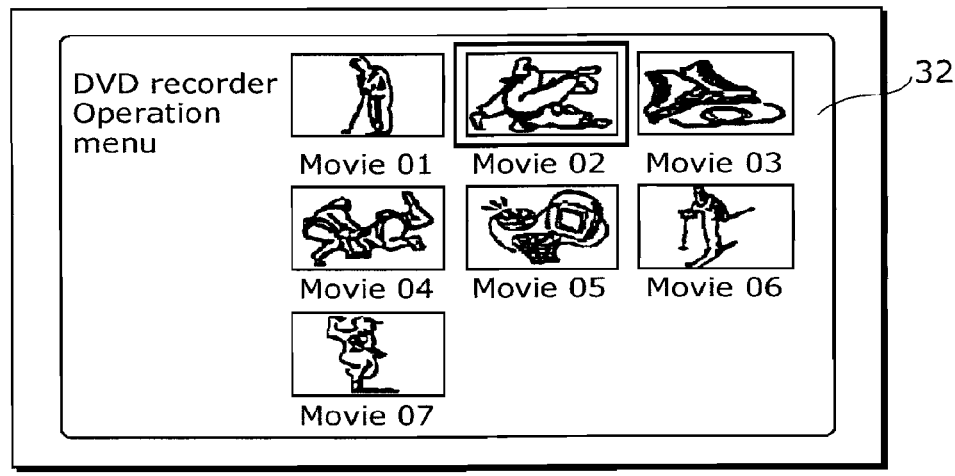
FIG. 12 shows an example of display according to the first embodiment.

Next, when the user pushes the "enter" key 45 which is currently being focused on the operation menu screen currently being outputted as shown in FIG. 12, the instruction receiving unit 201 of the control apparatus 20 receives an instruction "ENTER". Following this, as described above, the request information sending unit 204 sends the request information to the output apparatus 30, and the selection information sending unit 303 of the output apparatus 30 then sends the control apparatus 20 the selection information including the identification information "FF123456" of the audio video supplying apparatus 10*a* which is currently selected as the input source by the input selecting unit 301. The determination unit 202 of the control apparatus 20 obtains the identification information of the audio video supplying apparatus 10*a* included in this selection information, as information regarding a result of the determination of the input source. Then, the determination unit 202 designates, as a destination, the identification information of the audio video supplying apparatus 10*a*, and sends the control information "enter" corresponding to the instruction "ENTER" according to the control information management table shown in FIG. 8.

In accordance with: the control information "enter" received by the control information receiving unit 103*a*; and that the audio video information output unit 102*a* of the current audio video supplying apparatus 10*a* is "currently outputting menu", the control unit 104*a* of the audio video supplying apparatus 10*a* searches the control management table shown in FIG. 11 for a record which satisfies conditions that "State" is "Currently outputting menu" and that "Control information" is "enter". Then, the control information "play" which represents the attribute "Control" of this record is sent to the audio video information processing unit 101*a*. Note that "play" is the control information causing the audio video information processing unit 101*a* to execute the processing of "playing back the focused content".

As a result, according to the control information "play", the audio video information processing unit 101*a* obtains the audio video information corresponding to the icon "Movie 02" focused on the menu screen, from the DVD. Then, the obtained audio video information is outputted from the audio video information output unit 102*a* of the audio video supplying apparatus 10*a*. Receiving this audio video information, as the input, which is outputted from the audio video supplying apparatus 10*a*, the output apparatus 30 outputs the content "Movie 02" to the display 32.

Here, suppose that the user pushes a function key on the remote 40, the "pause" key 49 for example, but not a primary key. As in the above case where a primary key such as the "enter" key is pressed, the control information "pause" corresponding to the "pause" key 49 according to the control information management table shown in FIG. 8 is outputted to the audio video supplying apparatus 10*a* which is the input source. As described earlier, the control management table for the audio video supplying apparatus 10*a* that is shown in FIG. 8 also manages records which have, as the attributes "Control information", the control information corresponding to the function keys. Since the control information management table shown in FIG. 8 includes a record whose attribute "Control information" is "pause" and whose attribute "State" is "Currently playing back content", the control unit 104*a* controls the audio video information processing unit 101*a* and so forth according to the attribute "Control" of the record that satisfies the conditions. As a result, "Movie 02" outputted to the display 32 is outputted in a pause state.

Next, suppose that an instruction is given, by operating the remote 40, to the audio video supplying apparatus 10*c* of the output apparatus 30 to start the output. Also suppose that the control unit 104*c* of the audio video supplying apparatus 10*c* of the output apparatus 30 holds information of a channel, the channel "2" for example, which was being outputted when the power was turned off the last time, in a memory or the like (not illustrated). First, when the instruction to start the output is received, the control unit 104*c* of the audio video supplying apparatus 10*c* causes the input setting request information sending unit 105*c* of the audio video supplying apparatus 10*c* to send the input setting request information in order for its own apparatus to be set as the input source. This input setting request information includes the identification information "CC876543" of the audio video supplying apparatus 10*c*. It should be noted that sending/receiving and inputting/outputting of information inside its own apparatus may or may not be performed via a network or the like in the present embodiment. This will be the same in the other embodiment. Next, on the basis of the above-mentioned information regarding the channel, the channel which was being outputted the last time by the audio video information processing unit 101*c*, the channel "2" for example, is selected and the audio video information broadcasted on this channel is obtained. Then, the audio video information output unit 102*a* of the audio video supplying apparatus 10*c* outputs the audio video information of the channel "2" obtained by the audio video information processing unit 101*c* to the audio video information input unit 304 of the output apparatus 30.

When the first input setting request information receiving unit 306 of the output apparatus 30 receives the input setting request information sent from the audio video supplying apparatus 10*c*, the input selecting unit 301 judges whether or not the identification information "CC876543" stored in this input setting request information matches the identification information of the apparatus which is the current input source. In this case here, the identification information currently stored in the memory or the like is the identification information "FF123456" of the audio video supplying apparatus 10*a*, and is thus judged not to match the identification information "CC876543" of the audio video supplying apparatus 10*c* included in the input setting request information newly inputted. In accordance with this judgment result, the identification information showing the input source that is stored in the memory or the like is rewritten from the identification information "FF123456" of the audio video supplying apparatus 10*a* which is the current input source to the identification information "CC876543" of the audio video supplying apparatus 10*c*. Then, the apparatus represented by the rewritten identification information, namely the audio video supplying apparatus 10*c* in this case here, is selected as a new input source of the audio video information by the input selecting unit 301. As a result, as in the case of receiving the audio video information from the audio video supplying apparatus 10*b* described above, the audio video information input unit 304 receives the audio video information of the operation menu, as the input, which is sent from the audio video information output unit 102*c* of the audio video supplying apparatus 10*c*, and the audio video output unit 305 outputs the received audio video information of the channel "2" to the display 32. An example of the output is the same as shown in FIG. 7.

Next, when the user pushes the "down" key 43 of the remote 40 in order to change the channel, the instruction receiving unit 201 of the control apparatus 20 receives an instruction "DOWN". Following this, the request information sending unit 204 sends the request information to the output apparatus 30. When the request information receiving unit 302 of the output apparatus 30 receives the request information, the selection information sending unit 303 reads, from the memory or the like, the identification information "CC876543" of the audio video supplying apparatus 10*c* which is currently selected as the input source by the input selecting unit 301, and sends the selection information including this identification information "CC876543" to the control unit 20. When the selection information receiving unit 203 of the control apparatus 20 receives this selection information, the determination unit 202 determines the input source of the audio video information outputted by the output apparatus 30, on the basis of the selection information. To be more specific, in this case here, the identification information included in the selection information is obtained as information regarding a result of the determination of the input source. Then, the control information sending unit 205 designates, as a destination, the physical address of the audio video supplying apparatus 10*b* obtained as the determination result of the input source, and sends the control information "down" corresponding to the instruction "DOWN" according to the control information management table shown in FIG. 8.

The control unit 104*c* of the audio video supplying apparatus 10*c* controls the audio video information processing unit 101*c* according to the control information "down" received by the control information receiving unit 103*c*. In this case here, a control management table, which is used for managing a relation between: the control information received by the control information receiving unit 103*c* of the audio video supplying apparatus 10*c*; and the control performed on the audio video information processing unit 101*c* by the control unit 104*c* of the audio video supplying apparatus 10*c*, is the same as the control management table for the audio video supplying apparatus 10*b* shown in FIG. 9, as an example. To be more specific, the control unit 104*c* judges that the audio video information output unit 102*c* of the audio video supplying apparatus 10*c* is currently outputting the broadcasted audio video information, or equivalently, judges that the audio video information output unit 102*c* is "Currently outputting broadcast". Then, the control unit 104*c* searches the control management table shown in FIG. 9 for a record which satisfies conditions that "State" is "Currently outputting broadcast" and that "Control information" is "down". Then, the control information "channel_down" which represents the attribute "Control" of this record is sent to the audio video information processing unit 101*c*. Note that "channel_down" is the control information causing the audio video information processing unit 101*c* to execute the processing of "decreasing the channel number".

As a result, the audio video information processing unit 101*b* changes the channel from the channel "2" to one channel down, i.e., a channel "1" according to the control information "channel_down", and obtains audio video information of a program broadcasted on the channel "1". Then, the obtained audio video information is outputted from the audio video information output unit 102*c* of the audio video supplying apparatus 10*c*. Receiving this audio video information, as the input, which is outputted from the audio video supplying apparatus 10*c*, the output apparatus 30 outputs the program of the channel "1" to the display 32.

Here, suppose that the user pushes a function key on the remote 40, the "pause" key 49 for example, but not a primary key. As in the above case where a primary key such as the "enter" key is pressed, the control information "pause" corresponding to the "pause" key 49 according to the control information management table shown in FIG. 8 is outputted to the audio video supplying apparatus 10*a* which is the input source. As described earlier, the control management table for the audio video supplying apparatus 10c that is shown in FIG. 8 does not include a record which has the control information, as the attribute "Control information", corresponding to a function key. On account of this, the control unit 104c ignores this control information "pause" and does not make a change or the like in the processing.

According to the present embodiment as described so far, when an instruction is given to the control apparatus 20, control corresponding to this instruction is performed on the apparatus which is the input source of the audio video information that the output apparatus 30 is currently outputting. Thus, when wishing to make a change or the like regarding the audio video information currently being outputted, the user does not need to judge which apparatus is the input source of the audio video information currently being outputted. On account of this, the user can control the output of the audio video information without thinking about the apparatus to be operated, thereby enhancing the usability.

Moreover, according to the present embodiment, the control apparatus 20 which is an apparatus other than the output apparatus 30 can judge the input source of the audio video information being outputted by the output apparatus 30 and can thus control the apparatus as the input source. Accordingly, when this control apparatus 20 is a set-top box, for example, the apparatus which is the input source for the output apparatus 30 can be controlled by operating the set-top box using a remote or the like. In recent years, the proliferation of satellite broadcasting, cable broadcasting, Internet broadcasting, and the like has increased the number of users installing a set-top box which is designed specifically for receiving these broadcastings. An output of such a set-top box is inputted to an external input or the like of an output apparatus such as a TV, so that the satellite broadcasting, the cable broadcasting, the Internet broadcasting, and the like received by the set-top box can be outputted to the TV. In general, it is often the case that a remote for operating such a set-top box can send key codes to perform operations, such as turning on and off the power or the like, on the output apparatus such as a TV. On the other hand, few remotes of TVs can send key codes for operating a set-top box. For this reason, the number of users who use a remote of a set-top box for operating both the set-top box and a TV has been increasing. On this account, the application of the control apparatus 20 of the present embodiment to a set-top box can enhance convenience for the user.

It should be noted that the determination unit 202 of the control unit may judge, from the output state of the audio video information from the audio video supplying apparatus 10b, whether or not the audio video supplying apparatus 10b is the input source of the audio video information currently being outputted by the output apparatus 30. When the audio video supplying apparatus 10b is the input source, the control information may be sent, corresponding to the instruction received in Step S301 described above, to the control information receiving unit 103b of the audio video supplying apparatus 10b which is the audio video supplying apparatus of its own apparatus. When the audio video supplying apparatus 10b is not the input source, the processing may proceed to Step S302. With such processing, when an instruction is given to the control apparatus 20 using the remote 40 or the like, the number of times that the output apparatus 30 is inquired as to which apparatus is the input source can be reduced. Especially when this control apparatus 20 is a set-top box for cable television and satellite broadcasting as described in the above specific examples, it is often the case that this control apparatus 20 is used as a main receiving apparatus for television broadcasting since the number of channels is larger than that of general ground-based broadcasting. In this case, it is highly likely that many of the operations using the primary keys are performed to change the channels of the set-top box. For this reason, without performing the above-mentioned processing, the output apparatus 30 needs to be controlled every time the control apparatus 20 performs the processing for changing the channel. With the above-mentioned processing, the output apparatus 30 is not inquired even in the case of an instruction, which may occur with a relatively high frequency, issued to the control apparatus 20 for changing the channel. This can reduce the number of inquiries made from the control apparatus 20 to the output apparatus 30 and thus reduce the traffic between the control apparatus 20 and the output apparatus 30. This will be the same in the other embodiment.

It should be noted that, in the present embodiment, the configuration except for the audio video supplying apparatus 10b of the control apparatus 20 may be included in the output apparatus 30. This will be the same in the other embodiment.

Also, the control apparatus 20 and the output apparatus 30 may not include the audio video supplying apparatus 10b and the audio video supplying apparatus 10c respectively. This will be the same in the other embodiment.

Moreover, more than one audio video supplying apparatus may be set outside the control apparatus 20 and the output apparatus 30. This will be the same in the other embodiment.

Furthermore, more than one audio video supplying apparatus may be included in each of a control apparatus and an output apparatus. This will be the same in the other embodiment.

Figure 13:
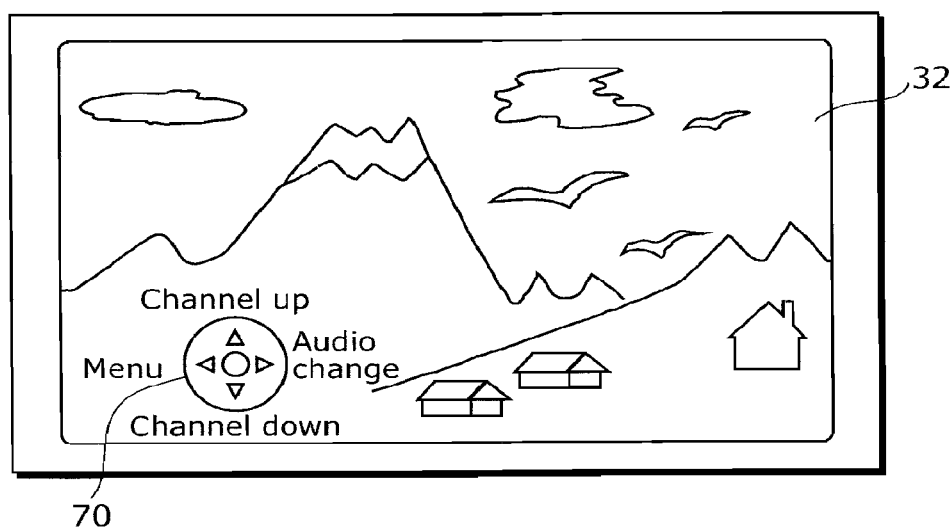
FIG. 13 shows a diagram according to the first embodiment.

Also note that, in the specific examples described above, a control correspondence image 70 may be displayed superimposed on the video information outputted to the display 32 in the lower left-hand corner of the video information, for example, as shown in FIG. 13 in contrast to the output of the output apparatus 30 shown in FIG. 7. The control correspondence image 70 diagrammatically shows instructions which can be given to the current input source of the audio video information, namely the audio video supplying apparatus 10a to 10c, through operations using the primary keys of the remote 40 while the audio video supplying apparatus 10a to 10c which is the input source is in the output state. That is to say, this control correspondence image 70 is an image showing a relation between the primary keys of the remote 40 and the current operation state of the audio video supplying apparatus 10a to 10c which is the current input source to be controlled using these primary keys. This control correspondence image 70 can be generated on the basis of an image previously stored in a memory or the like, the control management tables of FIGS. 9 and 11, and so forth. By displaying the control correspondence image 70 like this, it is possible to show the operations controllable through the primary keys to the user as appropriate, with the instruction details of the operations changing depending on the apparatus serving as the input source and on the state of the apparatus. This can improve the usability for the user.

It should be noted that, in each above embodiment, each component may be configured by dedicated hardware. Or, a component which can be realized by software may be realized by the execution of a program. For example, each component can be realized by a program execution unit, such as a CPU, that reads a software program recorded on a recording medium, such as a hard disk or a semiconductor memory, and executes the read program. Software for realizing the control apparatus of the audio video system in the above embodiment is a program as described below. Specifically, this program causes a computer to execute: an instruction receiving step of receiving an instruction to be given to an audio video supplying apparatus which is an input source of audio video information and which sends the audio video information to an output apparatus, the audio video information being regarding at least one of audio and video and currently being outputted from the output apparatus; a determination step of determining the audio video supplying apparatus to be the input source of the audio video information currently being outputted from the output apparatus; and a control information sending step of sending control information corresponding to the instruction received in the instruction receiving step, to the audio video supplying apparatus determined in the determination step.

Moreover, software for realizing the output apparatus of the audio video system in the above embodiment is a program as described below. Specifically, this program causes a computer to execute: an input selecting step of selecting one from among at least one audio video supplying apparatus which outputs audio video information regarding at least one of audio and video; an audio video information input step of receiving the audio video information outputted from the audio video supplying apparatus selected in the input selecting step; an audio video output step of outputting the received audio video information; and a selection information sending step of sending selection information indicating the audio video supplying apparatus selected in the input selecting step.

It should be noted that, in the stated programs, the sending step of sending information and the receiving step of receiving information do not include processing performed by hardware, such as processing performed by a modem, an interface card, or the like in the sending step (that is, processing performed only by hardware).

Moreover, this program may be executed through a download from a server, and may also be executed by reading a program recorded on a predetermined recording medium (for example, an optical disk like a CD-ROM, a magnetic disk, or a semiconductor memory).

Furthermore, the number of computers for executing the program may be one or more than one. In other words, the processing may be centralized or distributed.

Second Embodiment

An audio video system of the second embodiment is different from the audio video system of the first embodiment in that a control apparatus determines an input source of audio video information outputted by an output apparatus, on the basis of input setting request information received by the present control apparatus.

Figure 14:
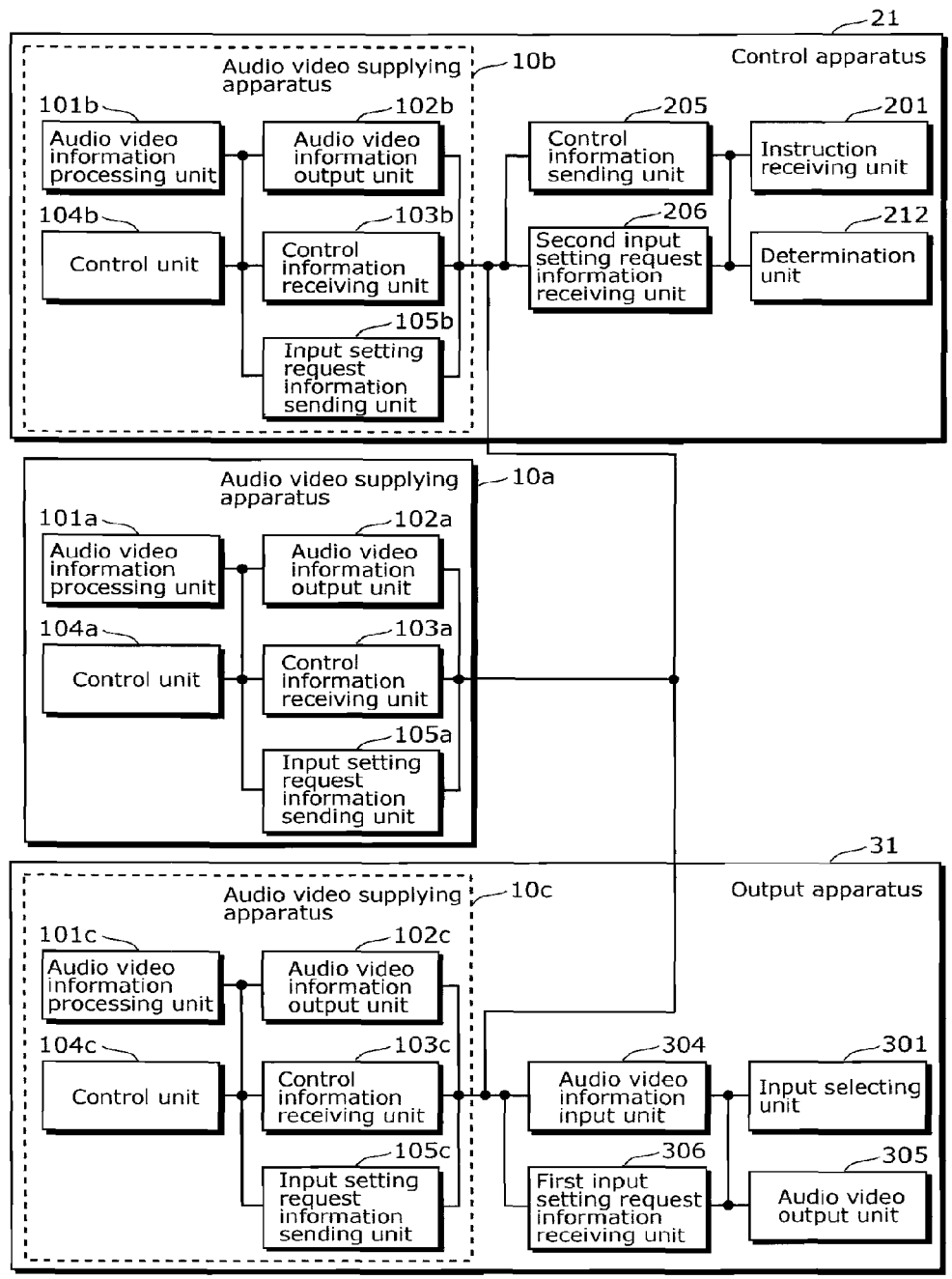
FIG. 14 is a block diagram of an audio video system according to a second embodiment.

FIG. 14 is a block diagram of an audio video system according to the present embodiment.

The audio video system includes audio video supplying apparatuses 10a to 10c, a control apparatus 21, and an output apparatus 31. Configurations of the audio video supplying apparatuses 10a to 10c are the same as those in FIG. 1 and, therefore, the explanation is omitted here. However, input setting request information sending units 105a to 105c send the input setting request information, which shows that the output of audio video information is to be started, to a second input setting request information receiving unit 206 of the control apparatus 21 as well. Alternatively, the input setting request information sending units 105a to 105c of the audio video supplying apparatuses 10a to 10c may broadcast the input request information using broadcasting means or the like, to all other connected apparatuses.

The output apparatus 31 includes an input selecting unit 301, an audio video information input unit 304, an audio video output unit 305, a first input setting request information receiving unit 306, and the audio video supplying apparatus 10c. Configurations of the input selecting unit 301, the audio video information input unit 304, the audio video output unit 305, and the first input setting request information receiving unit 306 are the same as those in FIG. 1 and, therefore, the explanation is omitted.

The control apparatus 21 includes an instruction receiving unit 201, a determination unit 212, a control information sending unit 205, the audio video supplying apparatus 10b, and the second input setting request information receiving unit 206. Configurations of the instruction receiving unit 201, the control information sending unit 205, and the audio video supplying apparatus 10b are the same as those in FIG. 1 and, therefore, the explanation is omitted.

The second input setting request information receiving unit 206 receives the input setting request information. The second input setting request information receiving unit 206 can be realized by a wireless or wired communication means or the like, and may also be realized by a means of receiving broadcasts.

The determination unit 212 determines the audio video supplying apparatus which is the input source of the audio video information currently being outputted by the output apparatus 30, on the basis of the input setting request information received by the second input setting request information receiving unit 206. To be more specific, it does not matter how the determination unit 212 determines the audio video supplying apparatus which is the input source. For example, the determination unit 212 may determine the audio video supplying apparatus 10a to 10c as the input source that has sent the latest input setting request information, out of the input setting request information sent from the audio video supplying apparatuses 10a to 10c and received by the second input setting request information receiving unit 206. Or, the input setting request information sent from the audio video supplying apparatuses 10a to 10c may always be updated and stored, so that the audio video supplying apparatus 10a to 10c which has sent the input setting request information currently stored or the audio video supplying apparatus 10a to 10c indicated by the present input setting request information may be set as the input source of the audio video information. Moreover, when the input setting request information includes identification information of an apparatus which requests to be selected as the input source, the identification information and the like included in the input setting request information may be stored instead of storing the input setting request information as described above. Then, on the basis of this identification information instead of the input setting request information, the audio video supplying apparatus to be the input source may be determined. It does not matter what timing or what trigger is used for the above-described determination performed by the determination unit 212. The determination unit 212 may perform the above-described determination at regular or irregular time intervals. Or, when the second input setting request information receiving unit 206 receives the input setting request information, the determination unit 212 may perform the above-described determination on the basis of the received selection information and then hold a result of the determination. The determination unit 212 can usually be realized by an MPU, a memory, or the like. The operating procedure of the determination unit 212 can usually be realized by software, and this software is recorded on a recording medium, such as a ROM. However, the procedure may be realized by hardware (a dedicated circuit).

Next, an operation performed by the audio video system according to the present embodiment is explained.

Operations performed by the audio video supplying apparatuses 10*a* to 10*c* are the same as those in the above embodiment and, therefore, the explanation is omitted here.

Figure 15:
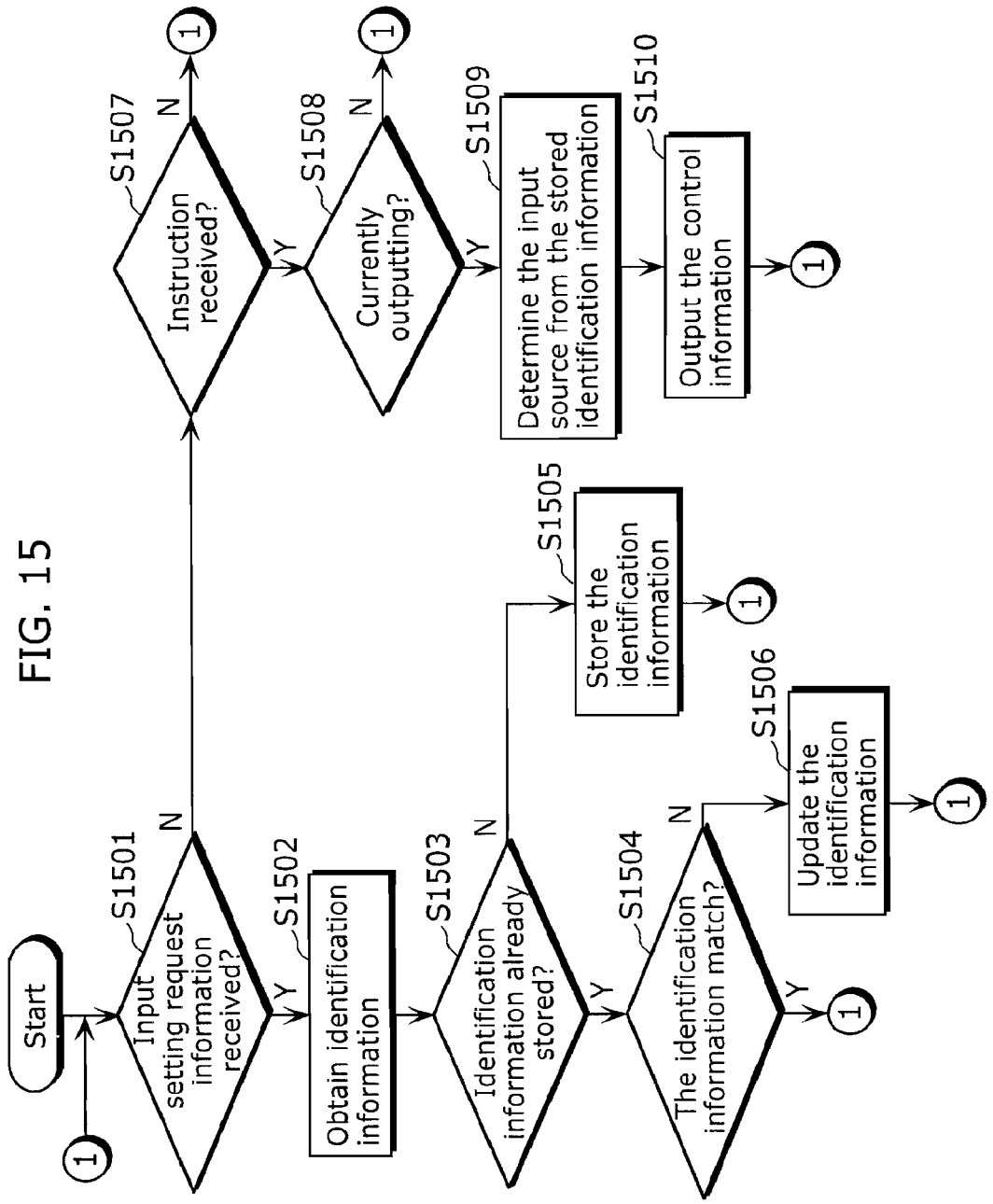
FIG. 15 is a flowchart for explaining an operation of a control apparatus according to the second embodiment.

Next, an operation performed by the control apparatus 21 is explained, with reference to a flowchart of FIG. 15. It should be noted here that the input setting request information stores the identification information of the apparatus requested to be set as the input source by this input setting request information, that is, the identification information of the audio video supplying apparatus 10*a* to 10*c*.

(Step S1501) The second input setting request information receiving unit 206 judges whether or not to have received the input setting request information. When the input setting request information has been received, the processing proceeds to S1502. When the input setting request information has not been received, the processing proceeds to S1507.

(Step S1502) The determination unit 212 obtains the identification information from the input setting request information received by the second input setting request information receiving unit 206.

(Step S1503) The determination unit 212 judges whether or not the identification information has already been stored in a storage medium such as a memory (not illustrated) of the control apparatus 21. When the identification information has already been stored, the processing proceeds to Step S1504. When the identification information has not been stored, the processing proceeds to Step S1505.

(Step S1504) The determination unit 212 judges whether or not the identification information obtained in Step S1502 matches the already-stored identification information. When these pieces of the information match with each other, the processing returns to Step S1501. When these pieces of the information do not match with each other, the processing proceeds to Step S1506.

(Step S1505) The determination unit 212 stores the identification information obtained in Step S1502, into the above-mentioned memory. Then, the processing returns to Step S1501.

(Step S1506) The determination unit 212 updates the identification information stored in the above-mentioned memory by overwriting the existing identification information with the identification information obtained in Step S1502. Then, the processing returns to Step S1501.

(Step S1507) The instruction receiving unit 201 judges whether or not to have received an instruction given to the audio video supplying apparatus 10*a* to 10*c* which is the input source of the audio video information currently being outputted by the output apparatus 31. When the instruction has been received, the processing proceeds to Step S1508. When the instruction has not been received, the processing returns to Step S1501.

(Step S1508) The determination unit 212 judges, from the identification information stored in the memory or the like, whether or not the output apparatus 31 is outputting the audio video information. To be more specific, when the identification information is stored, which means that the input source of the audio video information is set, the determination unit 212 judges that the output is being performed. When the input source is not set, the determination unit 212 judges that the audio video information is not being outputted. When the audio video information is being outputted, the processing proceeds to Step S1509. When the audio video information is not being outputted, the processing returns to Step S1501.

(Step S1509) The determination unit 212 determines the input source of the audio video information being outputted by the output apparatus 31, from the identification information stored in the memory or the like. Here, obtaining the stored identification information may equate to obtaining a result of the determination.

(Step S1510) The control information sending unit 205 outputs the control information corresponding to the instruction received in Step S1505 to the apparatus determined as the input source in Step S1507. Then, the processing returns to Step S1501.

It should be noted that the processing of the flowchart in FIG. 15 is terminated by an interrupt due to a power-off or an end of the processing.

The processing from Step S407 to Step S409 of the flowchart in FIG. 4 is omitted in the operation performed by the output apparatus 31. The detailed explanation is omitted here.

The following is an explanation about a specific operation performed by the audio video system according to the present embodiment. A conceptual diagram of the audio video system is the same as shown in FIG. 6 except that a control apparatus is the control apparatus 21 and an output apparatus is the output apparatus 31.

As in the case of the first embodiment described above, when the control apparatus 21 and the output apparatus 31 are turned on, the control unit 104*b* of the audio video supplying apparatus 10*b* causes the input setting request information sending unit 105*b* of the audio video supplying apparatus 10*b* to send the input setting request information including the identification information "BB678910" in order for its own apparatus to be set as the input source. In this case here, this input setting request information is sent to the output apparatus 30 and to the second input setting request information receiving unit 206 of the control apparatus 21 as well. Then, the channel which was being outputted the last time by the audio video information processing unit 101*b* is selected and the audio video information broadcasted on this channel is outputted from the audio video information output unit 102*b* to the output apparatus 30.

The output apparatus 31 causes the first input setting request information receiving unit 306 to receive the input setting request information sent from the control apparatus 21. Then, on the basis of the received input setting request information, the output apparatus 31 sets the audio video supplying apparatus 10*b* as the input source, receives the audio video information outputted from the audio video supplying apparatus 10*b*, and causes the audio video output unit 305 to output the audio video information, as in the case of the first embodiment described above.

When the second input setting request information receiving unit 206 of the control apparatus 21 receives the input setting request information sent from the internal audio video supplying apparatus 10*b*, the determination unit 212 obtains the identification information "BB678910" included in the input setting request information. Then, the determination unit 212 judges whether or not the identification information previously obtained from the input setting request information is stored in a predetermined memory. In this case here, suppose that the identification information is not stored because it is immediately after the power is turned on. Accordingly, the determination unit 212 stores the identification information "BB678910" obtained from the input setting request information into the predetermined memory.

Next, when the user pushes the "up" key 41 of the remote 40 in order to change the channel which is currently being outputted, the instruction receiving unit 201 of the control apparatus 21 receives the instruction "UP". Following this, since the identification information "BB5678910" is stored in the predetermined memory, the determination unit 212 judges that the output apparatus 31 is currently executing the output. From the identification information "BB5678910" stored in the memory or the like, the determination unit 212 determines the input source of the audio video information outputted by the output apparatus 31. In this case here, the identification information "BB5678910" of the audio video supplying apparatus 10*b* stored in the predetermined memory is obtained as a result of the determination. Then, the control information "up" corresponding to the instruction "UP" received by the instruction receiving unit 201 is sent to the audio video supplying apparatus 10*b* which is represented by this identification information "BB5678910". The processing to be performed following this is the same as in the case of the first embodiment described above and, therefore, the explanation is omitted.

Next, suppose that the power of the audio video supplying apparatus 10*a* is turned on and that the control unit 104*a* of the audio video supplying apparatus 10*a* causes the input setting request information sending unit 105*a* of the audio video supplying apparatus 10*a* to send the input setting request information in order for its own apparatus to be set as the input source. Here also, as is the above case, this input setting request information is sent to the output apparatus 31 and to the second input setting request information receiving unit 206 of the control apparatus 21 as well. Then, as in the case of the first embodiment described above, the audio video information for outputting an operation menu is outputted to the output apparatus 31.

As in the case of the first embodiment described above, the output apparatus 31 sets the audio video supplying apparatus 10*a* as the input source of the audio video information on the basis of this input setting request information, and the operation menu as shown in FIG. 10 is outputted.

When the second input setting request information receiving unit 206 of the control apparatus 21 receives the input setting request information sent from the audio video supplying apparatus 10*a*, the determination unit 212 obtains the identification information "FF123456" of the audio video supplying apparatus 10*a* included in this input setting request information. Following this, the determination unit 212 judges whether or not the identification information previously obtained from the input setting request information is stored in the above-mentioned predetermined memory included in the control apparatus 21. In this case here, the identification information "BB678910" of the audio video supplying apparatus 10*b* which is different from the identification information "FF123456" is already stored. For this reason, the determination unit 212 updates the identification information stored in the predetermined memory included in the control apparatus 21 by overwriting the identification information "BB678910" of the audio video supplying apparatus 10*b* with the identification information "FF123456" obtained from the input setting request information sent from the audio video supplying apparatus 10*a*.

Next, suppose that the user pushes the "right" key 42 to shift the focus to content called "Movie 02" shown on the immediate right side of "Movie 01" which is currently focused, on the operation menu screen currently being outputted as shown in FIG. 10. Then, the instruction receiving unit 201 of the control apparatus 21 receives an instruction "RIGHT". Following this, since the identification information "FF123456" is stored in the predetermined memory, the determination unit 212 judges that the output apparatus 31 is currently executing the output. From the identification information "FF123456" stored in the memory or the like, the determination unit 212 determines the input source of the audio video information outputted by the output apparatus 31. In this case here, the identification information "FF123456" of the audio video supplying apparatus 10*a* stored in the predetermined memory is obtained as a result of the determination. Then, the control information "right" corresponding to the instruction "RIGHT" received by the instruction receiving unit 201 is sent to the audio video supplying apparatus 10*a* which is represented by this identification information "FF123456". The processing to be performed following this is the same as in the case of the first embodiment described above and, therefore, the explanation is omitted.

According to the present embodiment as described so far, when an instruction is given to the control apparatus 21, control corresponding to this instruction is performed on the apparatus which is the input source of the audio video information that the output apparatus 31 is currently outputting. Thus, when wishing to make a change or the like regarding the audio video information currently being outputted, the user does not need to judge which apparatus is the input source of the audio video information currently being outputted. On account of this, the user can control the output of the audio video information without thinking about the apparatus to be operated, thereby enhancing the usability.

Moreover, in the present embodiment, the input setting request information outputted from the audio video supplying apparatuses 10*a* to 10*c* is received by the second input setting request information receiving unit 206. On the basis of the received input setting request information, the determination unit 212 of the control apparatus 21 determines the audio video supplying apparatus which is the input source of the audio video information currently being outputted by the output apparatus 31. As a result, when an instruction is given to the control apparatus 21, the control apparatus 21 can determine the audio video supplying apparatus which is the input source of the audio video information currently being outputted by the output apparatus 31, without inquiring of the output apparatus 31. Accordingly, the request information, the selection information, and so forth do not need to be sent and received between the control apparatus 21 and the output apparatus 31, thereby reducing a time taken for the determination unit 212 to determine the audio video supplying apparatus which is the input source of the audio video information. As a consequence, a processing time taken for the instruction given to the control apparatus 21 to be reflected in the output from the output apparatus 31 can be reduced, thereby enhancing the usability.

It should be noted that, in the present embodiment, the configuration except for the audio video supplying apparatus 10*b* of the control apparatus 21 may be included in the output apparatus 31. This will be the same in the other embodiment.

It should be noted that although the explanation has been given as to the case where the apparatuses are connected via the network in the specific examples in each above embodiment, it does not matter how the apparatuses are connected in the present embodiment. For example, of the connections between the apparatuses, a connection for sending and receiving the control information or the like may be established by a cable or a line dedicated for the control information whereas a connection for sending and receiving the audio video information or the like may be established by a cable or a line dedicated for the audio video information.

It should be noted that, in each above embodiment, each processing (each function) may be realized through centralized processing performed by a single apparatus (system), or may be realized through distributed processing performed by a plurality of apparatuses.

Moreover, it should be understood that, in each above embodiment, more than two communication means (such as an information sending unit) existing in one apparatus may be realized by one physical medium.

It is obvious that the present invention is not limited to the embodiments described above, and that various modifications are possible. Accordingly, all such modifications are intended to be included within the scope of the present invention.

INDUSTRIAL APPLICABILITY

As described so far, the audio video system of the present invention is suitable as an audio video system including an output apparatus which outputs audio video information outputted by an audio video supplying apparatus. In particular, the system of the present invention is useful as an audio video system including an output apparatus which outputs audio video information outputted by an audio video supplying apparatus selected from among a plurality of audio video supplying apparatuses.

The invention claimed is:

1. A control apparatus for controlling a plurality of audio video supplying apparatuses which are each operable to output audio video information to an output apparatus, the audio video information including at least one of audio data or video data, said control apparatus comprising:

an instruction receiving unit operable to receive an instruction to be provided to one of the audio video supplying apparatuses which is an input source of audio video information currently being outputted by the output apparatus;

a determination unit operable to determine the audio video supplying apparatus which is the input source of the audio video information currently being outputted by the output apparatus;

a control information sending unit operable to send control information corresponding to the instruction received by said instruction receiving unit to the audio video supplying apparatus determined by said determination unit; and an input setting request information receiving unit operable to judge whether or not input setting request information has been received from the audio video supplying apparatus, the input setting request information indicating that the output of the audio video information is to be started, wherein, when said input setting request information receiving unit judges that the input setting request information has not been received, said instruction receiving unit judges whether or not the instruction to be provided to the audio video supplying apparatus which is the input source of the audio video information currently being outputted from the output apparatus has been received, wherein, when said instruction receiving unit judges that the instruction has been received, said determination unit judges whether or not the output apparatus is outputting the audio video information, and wherein, when said determination unit judges that the output apparatus is outputting the audio video information, said determination unit further determines the input source of the audio video information being outputted by the output apparatus and said control information sending unit sends the control information corresponding to the received instruction to the audio video supplying apparatus which is the input source of the audio video information currently being outputted from the output apparatus.

2. The control apparatus according to claim 1, wherein said control apparatus is a set-top box.

3. The control apparatus according to claim 1, wherein said control apparatus internally includes at least one of the audio video supplying apparatuses.

* * * * *